United States Patent
Yanai et al.

(10) Patent No.: US 8,159,639 B2
(45) Date of Patent: Apr. 17, 2012

(54) VA-MODE LIQUID CRYSTAL DISPLAY DEVICE

(75) Inventors: Yujiro Yanai, Minami-ashigara (JP); Hajime Nakayama, Minami-ashigara (JP); Hirofumi Toyama, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 593 days.

(21) Appl. No.: 12/363,976

(22) Filed: Feb. 2, 2009

(65) Prior Publication Data
US 2009/0225262 A1 Sep. 10, 2009

(30) Foreign Application Priority Data
Feb. 4, 2008 (JP) .................. 2008-023526

(51) Int. Cl.
*G02F 1/1335* (2006.01)

(52) U.S. Cl. .......... 349/119; 349/96; 349/121; 349/120; 349/117

(58) Field of Classification Search .............. 349/96, 349/117–121
See application file for complete search history.

(56) References Cited

U.S. PATENT DOCUMENTS

| | | |
|---|---|---|
| 2004/0239852 A1 | 12/2004 | Ono et al. |
| 2007/0182895 A1* | 8/2007 | Fukagawa et al. ............. 349/117 |
| 2008/0174724 A1* | 7/2008 | Nakayama et al. ............. 349/96 |
| 2008/0192192 A1* | 8/2008 | Toyama et al. ................ 349/117 |
| 2008/0198303 A1* | 8/2008 | Taguchi .......................... 349/96 |
| 2009/0153782 A1* | 6/2009 | Fukagawa et al. ............. 349/96 |

FOREIGN PATENT DOCUMENTS
JP 3648240 B2 5/2002
JP 3330574 B2 9/2002
* cited by examiner

*Primary Examiner* — Huyen Ngo
(74) *Attorney, Agent, or Firm* — Buchanan Ingersoll & Rooney PC

(57) ABSTRACT

A liquid-crystal display device comprising a liquid-crystal cell comprising a liquid-crystal layer that aligns vertically to the substrate thereof in the black state, first and second polarizing elements that are disposed to sandwich the liquid-crystal cell therebetween so that their absorption axes are orthogonal to each other, a retardation film A and a retardation film B, wherein the retardation films A and B are equivalent to each other in terms of retardation in plane at a wavelength of 548 nm, Re(548), and retardation along thickness direction at a wavelength of 548 nm, Rth(548) thereof, but differ from each other in terms of the wavelength dispersion characteristics of retardation in plane Re and/or retardation along thickness direction Rth thereof in a visible light region, is disclosed.

25 Claims, 5 Drawing Sheets

| Protective Film |
|---|
| Polarizing Element |
| Retardation Film X |
| VA-cell |
| Retardation Film X |
| Polarizing Element |
| Protective Film |

PRIOR ART  PRIOR ART

| Protective Film |
|---|
| Polarizing Element |
| Retardation Film X' |
| VA-cell (different $\Delta$nd) |
| Retardation Film X' |
| Polarizing Element |
| Protective Film |

PRIOR ART  PRIOR ART

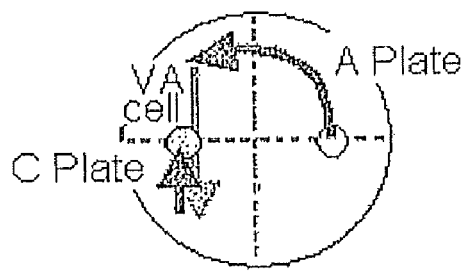
| Protective Film |
| --- |
| Polarizing Element |
| C Plate |
| VA-cell |
| A Plate |
| Polarizing Element |
| Protective Film |
Fig. 8A
Fig. 8B
PRIOR ART
PRIOR ART
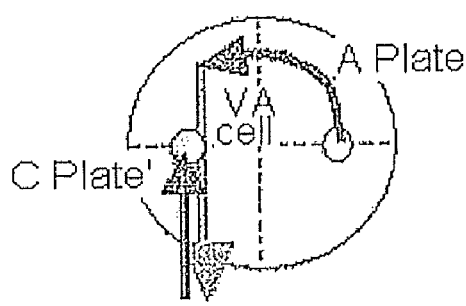
| Protective Film |
| --- |
| Polarizing Element |
| C Plate' |
| VA-cell (different Δnd) |
| A Plate |
| Polarizing Element |
| Protective Film |
Fig. 9A
Fig. 9B
PRIOR ART
PRIOR ART

VA-MODE LIQUID CRYSTAL DISPLAY DEVICE

CROSS-REFERENCE TO RELATED APPLICATIONS

This application claims benefit of priority under 35 U.S.C. 119 to Japanese Patent Application No. 2008-023526 filed on Feb. 4, 2008, which is expressly incorporated herein by reference in its entirety.

BACKGROUND OF THE INVENTION

1. Technical Field

The present invention relates to a liquid-crystal display device comprising a polarizer and a retardation film, and in particular to a VA (vertical alignment)-mode liquid-crystal display device.

2. Background Art

It is known that a VA-mode liquid-crystal display device can realize a broad viewing angle, or that is, can have improved display characteristics, as comprising polarizers each disposed on and below a liquid-crystal cell with their absorption axes orthogonal to each other, and having an optically biaxial retardation film disposed between each polarizer and the liquid-crystal cell (for example, Japanese Patent 3330574).

FIG. 6B shows a cross section of a liquid-crystal display device in which the above-mentioned, optically-biaxial retardation films having the same optical anisotropy are disposed on and below the VA-cell; and FIG. 6A shows the polarization state of the light that passes through the constitutive layers, as arrows on a Poincare sphere. In this system, a film of the same type may be disposed on and below the VA cell to enable optical compensation, therefore having the advantage in that the mass-scale production cost is reduced. However, replacing a liquid crystal cell in this system with another, having a different $\Delta nd$, always needs to re-optimize retardation in plane Re and retardation along thickness direction Rth of the biaxial retardation films for compensating birefringence of the another liquid crystal cell (for example, as shown in FIGS. 7A and 7B). Variously changing $\Delta nd$ of the liquid-crystal cell is under investigation for the purpose of power saving and rapid response; and trying to compensate the system employing the such a different liquid crystal cell by two retardation films having the same optical anisotropy, the optimum optical characteristics of the retardation films must be re-planned for each of liquid-crystal cells having a different value of $\Delta nd$, and the production line must thereby be re-planned.

On the other hand, a system has been proposed for reducing the light leakage depending on the variation of wavelength of light, or that is, for reducing the color shift in undesirable coloration in blue or red, which is observed in the oblique directions in the black state of liquid-crystal display devices. In the proposed system, used are two retardation films, concretely, an optically-positive monoaxial film (generally A plate) and an optically-negative monoaxial film (generally C plate), having a specific wavelength dispersion characteristics of retardation (for example, Japanese Patent 3648240). FIG. 8B shows a cross section of a liquid-crystal display device of a combination of A plate and C plate; and FIG. 8A shows the polarization state of the light that passes through the constitutive layers, as arrows on a Poincare sphere. In this system, it is unnecessary to change the optical characteristics of the A plate for optical compensation of the liquid-crystal cell of which the $\Delta nd$ may change variously; and in this, only changing the optical characteristics of the C plate may be enough to satisfy the condition of the changing $\Delta nd$ of the liquid-crystal cell (for example, as shown in FIGS. 9A and 9B). However, this system requires polarization change with the A plate to the vertical line that passes through the extinction point P, and for attaining the polarization change, Re and Rth of the A plate must be increased. Specifically, the system needs to employ A plate have large Re and Rth; however, it is not easy to produce retardation films having such optical characteristics. It is not also easy to produce on an industrial scale a film satisfying the optical characteristics required for C plate (in a precise sense thereof, its retardation in plane (Re) is zero and its Rth is large). This is because, in industrial-scale continuous production of films, in general, the produced films may have some Re in the machine (or transversal) direction. Such films having some Re are, in a precise sense thereof, optically biaxial films.

SUMMARY OF THE INVENTION

An object of the invention is to improve the performance of liquid-crystal display devices so as to satisfy the recent requirement in the art for liquid-crystal display devices having more improved display quality, concretely, to realize a high-contrast in a wide viewing angle. Recently, in addition, cost reduction in producing liquid-crystal display devices is much desired in the art; and for satisfying the requirement, another object of the invention is to propose a novel optical compensation system over the above-mentioned ordinary optical compensations system and to reduce the production cost of retardation films as optical components of liquid-crystal display devices, therefore realizing easy production of liquid crystal display devices.

For improving the above mentioned problems, the present inventors conducted various studies regarding the two systems mentioned above, and as a result, they found that, by employing two optically-biaxial films, retardation films A and B, disposed on and below a liquid crystal cell, being different from each other in terms of wavelength dispersion characteristics of optical anisotropy, it is possible to provide a novel system, referred to as "hetero"-system because it employs two optically-biaxial films of which optically anisotropy is different from each other (on the other hand, the above mentioned system shown in FIGS. 6A and 6B, referred to as "homo"-system because it employs two optically-biaxial films of which optically anisotropy is same), which is a system intermediate between the systems shown in FIGS. 6A-6B and 8A-8B respectively; and they also found that a VA-mode liquid crystal display device, employing the "hetero"-system, has a high viewing-angle contrast. One example of a mechanism for compensation of the liquid crystal display device is shown in FIGS. 5A-5C, and its details will be described hereinafter. According to the "hetero"-system, the variation of a liquid crystal cell on terms of $\Delta nd$ can be handled by replacing only one of two retardation films, for example retardation film A, with other film without replacing another, retardation film B; and therefore the present invention is preferable in terms of productivity of retardation films and liquid crystal display devices.

The means for achieving the above mentioned objects are as follows.

[1] A liquid-crystal display device comprising:

a liquid-crystal cell comprising a liquid-crystal layer that aligns vertically to the substrate thereof in the black state, first and second polarizing elements that are disposed to sandwich the liquid-crystal cell therebetween so that their absorption axes are orthogonal to each other, a retardation film A disposed between the first polarizing element and the liquid-crystal cell and satisfying the following conditions (I) and (II), and a retardation film B disposed between the second polarizing element and the liquid-crystal cell and satisfying the following conditions (I) and (II), wherein the retardation films A and B are equivalent to each other in terms of retardation in plane at a wavelength of 548 nm, Re(548), and retardation along thickness direction at a wavelength of 548 nm, Rth(548) thereof, but differ from each other in terms of the wavelength dispersion characteristics of retardation in plane Re and/or retardation along thickness direction Rth thereof in a visible light region:

$$30 \text{ nm} \leq Re(548) \leq 80 \text{ nm}, \quad (I)$$

$$70 \text{ nm} \leq Rth(548) \leq 140 \text{ nm}, \quad (II)$$

where Re(λ) [nm] means retardation in plane of the film measured at a wavelength λ [nm]; and Rth(λ) [nm] means retardation along thickness direction of the film measured at a wavelength λ [nm].

[2] The liquid-crystal display device as set forth in [1], wherein retardation in plane Re of the retardation film A satisfies any of the following conditions (III) to (V), and retardation in plane Re of the retardation film B satisfies any of the following conditions (III) to (V) other than that which Re of the retardation film A satisfies:

$$Re(446)/Re(548)<1 \text{ and } Re(628)/Re(548)>1, \quad (III)$$

$$Re(446)/Re(548)>1 \text{ and } Re(628)/Re(548)<1, \quad (IV)$$

$$|Re(446)-Re(628)|/Re(548)<0.03. \quad (V)$$

[3] The liquid-crystal display device as set forth in [1] or [2], wherein retardation along thickness direction Rth of the retardation film A satisfies any of the following conditions (VI) to (VIII), and retardation along thickness direction Rth of the retardation film B satisfies any of the following conditions (VI) to (VII) other than that which Rth of the retardation film A satisfies:

$$Rth(446)/Rth(548)<1 \text{ and } Rth(628)/Rth(548)>1, \quad (VI)$$

$$Rth(446)/Rth(548)>1 \text{ and } Rth(628)/Rth(548)<1, \quad (VII)$$

$$|Rth(446)-Rth(628)|/Rth(548)<0.0125. \quad (VIII)$$

[4] The liquid-crystal display device as set forth in any one of [1] to [3], wherein at least one of the retardation films A and B is a norbornene-based polymer film.

[5] The liquid-crystal display device as set forth in any one of [1] to [4], wherein at least one of the retardation films A and B is a cellulose acylate film.

[6] The liquid-crystal display device as set forth in [5], wherein the cellulose acylate film comprises a cellulose acylate having at least one acyl group selected from an acetyl group, a propionyl group and a butyryl group.

[7] The liquid-crystal display device as set forth in [5], wherein the cellulose acylate film comprises a cellulose acylate having at least two acyl groups selected from an acetyl group, a propionyl group and a butyryl group.

[8] The liquid-crystal display device as set forth in any one of [5] to [7], wherein the cellulose acylate film comprises at least one discotic compound having an absorption peak at a wavelength falling within the range from 250 nm to 380 nm.

[9] The liquid-crystal display device as set forth in any one of [5] to [8], wherein the cellulose acylate film comprises at least one liquid crystal compound.

[10] The liquid-crystal display device as set forth in [9], wherein said at least one liquid crystal compound is a compound represented by formula (A):

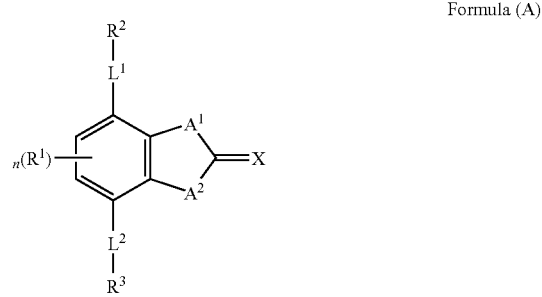

Formula (A)

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

[11] The liquid-crystal display device as set forth in [9], wherein said at least one liquid crystal compound is a compound represented by formula (a):

$$Ar^1\text{-}L^2\text{-}X\text{-}L^3\text{-}Ar^2 \quad \text{Formula (a):}$$

where $Ar^1$ and $Ar^2$ independently represent an aromatic group; $L^2$ and $L^3$ independently represent —O—CO— or —CO—O—; and X represents 1,4-cyclohexylen, vinylene or ethynylene.

[12] The liquid-crystal display device as set forth in [9], wherein said at least one liquid crystal compound is a compound represented by formula (I):

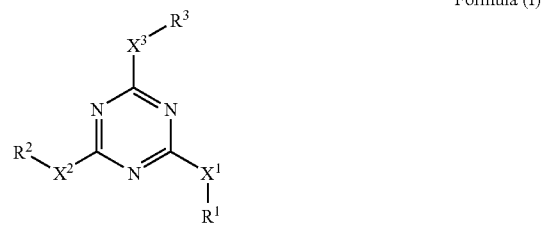

Formula (I)

where $X^1$ represents a single bond, —$NR^4$—, —O— or —S—; $X^2$ represents a single bond, —$NR^5$—, —O— or —S—; $X^3$ represents a single bond, —$NR^6$—, —O— or —S—; $R^1$, $R^2$, and $R^3$ independently represent an alkyl group, an alkenyl group, an aromatic ring group or a hetero-ring group; and $R^4$, $R^5$ and $R^6$ independently represent a hydrogen atom, an alkyl group, an alkenyl group, an aryl group or a hetero-ring group.

[13] The liquid-crystal display device as set forth in any one of [1] to [12], wherein the thickness of the retardation films A and B is from 30 to 100 μm each.

[14] The liquid-crystal display device as set forth in any one of [1] to [13], wherein at least one of the retardation films A and B is a stretched film.

BRIEF DESCRIPTION OF THE DRAWINGS

FIG. 8B is a schematic cross-sectional view of a conventional VA-mode liquid-crystal display device, and FIG. 8A is a schematic view of one example of an optical compensation system in the device.

FIG. 9B is a schematic cross-sectional view of a conventional VA-mode liquid-crystal display device, and FIG. 9A is a schematic view of one example of an optical compensation system in the device.

Figure 1:
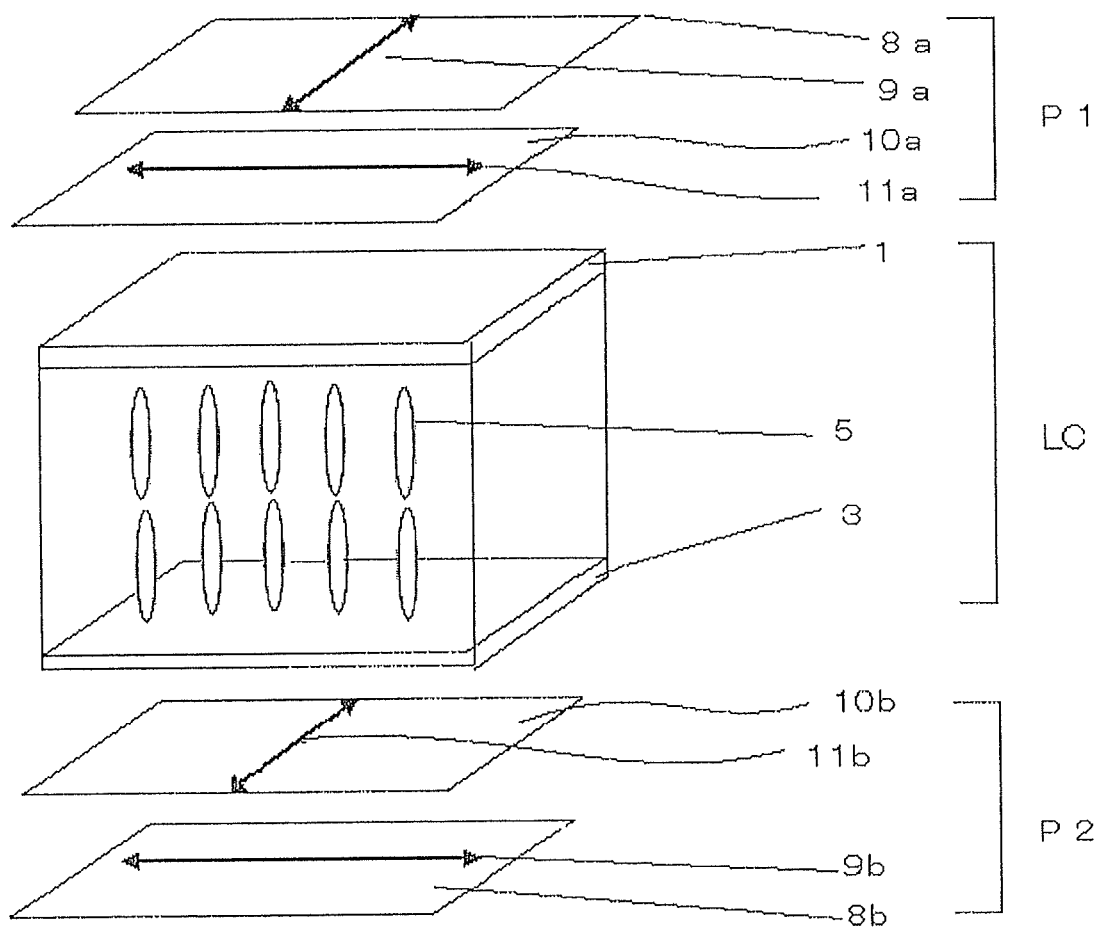
FIG. 1 is a schematic outline view of one example of a liquid-crystal display device of the invention.

In the drawings, the reference numerals have the following meanings:
1 Upper substrate of liquid-crystal cell
3 Lower substrate of liquid-crystal cell
5 Liquid-crystal layer
8a Upper polarizing film
9a Absorption axis of upper polarizing film
8b Lower polarizing film
9b Absorption axis of lower polarizing film
10a Upper retardation film
10b Lower retardation film
11a In-plane slow axis of upper retardation film
11b In-plane slow axis of lower retardation film
LC Liquid-crystal cell
P1, P2 Polarizing plates

DETAILED DESCRIPTION OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

First of all, the terms to be used in the description will be explained.

[Definitions of Re and Rth]

In the description, Re(λ) (unit: nm) and Rth(λ) (unit: nm) each indicate retardation in plane and retardation along thickness direction of a sample, a film or the like, at a wavelength λ. Re(λ) is measured by applying a light having a wavelength of λ nm in the normal direction of the film, using KOBRA-21ADH or WR (by Oji Scientific Instruments).

When a film to be tested is represented by an uniaxial or biaxial refractive index ellipsoid, then its Rth(λ) is calculate according to the method mentioned below.

With the in-plane slow axis (determined by KOBRA 21ADH or WR) taken as the inclination axis (rotation axis) of the film (in case where the film has no slow axis, the rotation axis of the film may be in any in-plane direction of the film), Re(λ) of the film is measured at 6 points in all thereof, up to +50° relative to the normal direction of the film at intervals of 10°, by applying a light having a wavelength of λ nm from the inclined direction of the film.

With the in-plane slow axis from the normal direction taken as the rotation axis thereof, when the film has a zero retardation value at a certain inclination angle, then the symbol of the retardation value of the film at an inclination angle larger than that inclination angle is changed to a negative one, and then applied to KOBRA 21ADH or WR for computation.

With the slow axis taken as the inclination axis (rotation axis) (in case where the film has no slow axis, the rotation axis of the film may be in any in-plane direction of the film), the retardation values of the film are measured in any inclined two directions; and based on the data and the mean refractive index and the inputted film thickness, Rth may be calculated according to the following formulae (X) and (XI):

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad (X)$$

$$Rth = \{(nx + ny)/2 - nz\} \times d \quad (XI)$$

wherein Re(θ) means the retardation value of the film in the direction inclined by an angle θ from the normal direction; nx means the in-plane refractive index of the film in the slow axis direction; ny means the in-plane refractive index of the film in the direction vertical to nx; nz means the refractive index of the film vertical to nx and ny; and d is a thickness of the film.

When the film to be tested can not be represented by a monoaxial or biaxial index ellipsoid, or that is, when the film does not have an optical axis, then its Rth(λ) may be calculated according to the method mentioned below.

With the in-plane slow axis (determined by KOBRA 21ADH or WR) taken as the inclination axis (rotation axis) of the film, Re(λ) of the film is measured at 11 points in all thereof, from −50° to +50° relative to the normal direction of the film at intervals of 10°, by applying a light having a wavelength of λ nm from the inclined direction of the film. Based on the thus-determined retardation data of Re(λ), the mean refractive index and the inputted film thickness, Rth(λ) of the film is calculated with KOBRA 21ADH or WR.

The mean refractive index may be used values described in catalogs for various types of optical films. When the mean refractive index has not known, it may be measured with Abbe refractometer. The mean refractive index for major optical film is described below: cellulose acetate (1.48), cycloolefin polymer (1.52), polycarbonate (1.59), polymethylmethacrylate (1.49), polystyrene (1.59).

The mean refractive index and the film thickness are inputted in KOBRA 21ADH or WR, nx, ny and nz are calculated therewith. From the thus-calculated data of nx, ny and nz, Nz=(nx−nz)/(nx−ny) is further calculated.

In the description, the term "slow axis" means a direction giving a maximum refractive index. In the description, the term "visible light region" means a range from 380 nm to 780 nm. And it is to be noted that the refractive indexes are measured at 548 nm unless the wavelength is specified.

In this description, the numerical data, the numerical ranges and the qualitative expressions (for example, expressions of "equivalent", "equal") that indicate the optical characteristics of constitutive members such as retardation films and liquid-crystal layers should be interpreted to indicate the numerical data, the numerical ranges and the properties including errors that are generally acceptable for liquid-crystal display devices and their constitutive members.

In this description, the expression that Re(548) and Rth (548) are equivalent in two retardation films means that the difference in the absolute value of Re(548) between the two is not more than 1.5 nm, and the difference in the absolute value of Rth(548) between the two is not more than 1.5 nm. In this description, the expression that "the optical anisotropy is equivalent" in two retardation films has the same meaning as that of the expression that "Re(548) and Rth(548) are equivalent".

In this description, the expression that the wavelength dispersion characteristics of retardation in plane (Re) and retardation along thickness direction (Rth) in a visible light region differ between two retardation films means that, on a curve formed by plotting Re and Rth of retardation films, as measured according to the above-mentioned method for light at a varying wavelength (in a visible light region), on the vertical axis, and plotting the wavelength of the incident light (in a visible light region) on the horizontal axis, the inclination of the asymptote thereof (linear line) differs between the two retardation films. In this description, in case where the above inclination is numerically expressed, the difference between the retardation values at a wavelength 628 nm and 446 nm is divided by the retardation value at 548 nm, or that is, the inclination of retardation in plane (Re) is expressed by {Re (628)−Re(446)}/Re(548); and the inclination of retardation along thickness direction (Rth) is by {Rth(628)−Rth(446)}/Rth(548). Even when the positivity or the negativity of the inclination is the same but when the absolute value of the inclination differs, the two retardation films shall differ in terms of the wavelength dispersion characteristics of retardation thereof. In this, the case where the absolute value of the inclination differs between the two retardation films means that the inclination of retardation in plane (Re) shall have a difference of at least 0.03 therebetween, and that the inclination of retardation along thickness direction (Rth) shall have a difference of at least 0.0125 therebetween. The retardation films of which the inclination is positive or negative, and the retardation film of which the inclination is zero shall be differentiated from each other, meaning that the films have different wavelength dispersion characteristics of retardation. In this description, the case where the inclination is zero includes a case having a minor inclination near to zero, in consideration of various errors in numerical determination. Specifically, a case where the absolute value of the inclination of Re is less than 0.03, and a case where the absolute value of the inclination of Rth is less than 0.0125 are both considered as the case where the inclination is zero. Regarding Re and Rth in the following description, the expression of "regular wavelength dispersion characteristics" and "reversed wavelength dispersion characteristics" of the retardation is as follows: The former means that Re or Rth increases when the wavelength of the incident light is shorter, or that is, the above-mentioned inclination of the retardation is negative; and the former means that Re or Rth increases when the wavelength of the incident light is longer, or that is, the above-mentioned inclination of the retardation is positive.

A schematic outline view of one example of a liquid-crystal display device of the invention is shown in FIG. 1. In FIG. 1, the top is a viewers' side (front side), and the bottom is a backlight side.

The VA-mode liquid-crystal display device of FIG. 1 has a liquid-crystal cell LC (having an upper substrate 1, a lower substrate 3 and a liquid-crystal layer 5), and a pair of upper polarizing plate P1 and lower polarizing plate P2 disposed to sandwich the liquid-crystal cell LC therebetween. In general, a polarizing film is built in a liquid-crystal display device as a polarizing plate having a protective film on both surfaces thereof; but in FIG. 1, the outer protective film of the polarizing film is omitted. The polarizing plates P1 and P2 each have polarizing films 8a and 8b, respectively; and they are disposed so that their absorption axes 9a and 9b are orthogonal to each other. The liquid-crystal cell LC is a VA-mode liquid-crystal cell; and in the black state, the liquid-crystal layer 5 is in homeotropic alignment, as in FIG. 2. The upper substrate 1 and the lower substrate 3 each have an alignment film (not shown) and an electrode layer (not shown) on the inner face thereof, and the inner face of the substrate 1 on the viewers' side additionally has a color filter layer (not shown).

Between the upper substrate 1 and the upper polarizing film 8a, and between the lower substrate 3 and the lower polarizing film 8b, retardation films 10a and 10b, respectively, are disposed. The retardation films 10a and 10b are optically biaxial, concretely satisfying the following conditions (i) and (II), and they are equivalent to each other in terms of retardation in plane at a wavelength of 548 nm, Re(548), and retardation along thickness direction at a wavelength of 548 nm, Rth(548).

$$30 \text{ nm} \leq Re(548) \leq 80 \text{ nm} \tag{I}$$

$$70 \text{ nm} \leq Rth(548) \leq 140 \text{ nm} \tag{II}$$

Preferably, the retardation films 10a and 10b satisfy the following conditions (I)' and (II)':

$$40 \text{ nm} \leq Re(548) \leq 70 \text{ nm} \tag{I}'$$

$$90 \text{ nm} \leq Rth(548) \leq 130 \text{ nm}, \tag{II}'$$

more preferably, the following conditions (I)" and (II)":

$$45 \text{ nm} \leq Re(548) \leq 70 \text{ nm} \tag{I}''$$

$$100 \text{ nm} \leq Rth(548) \leq 125 \text{ nm}. \tag{II}''$$

The retardation films 10a and 10b are disposed so that their in-plane slow axes 11a and 11b each are orthogonal to the absorption axes 9a and 9b of the upper polarizing film 8a and the lower polarizing film 8b, respectively. Specifically, the retardation films 10a and 10b are disposed so that their slow axes are orthogonal to each other.

The retardation films 10a and 10b may serve also as protective films for the polarizing films 8a and 8b, respectively.

The liquid-crystal display device of the invention satisfies the requirement of thickness reduction; and in the prior-art technique, Δnd of a liquid-crystal layer (Δn: birefringence of liquid crystal, d: layer thickness) is 350 nm or so, but in the liquid-crystal display of FIG. 1, Δnd of the liquid-crystal layer 5 can be from 250 to 345 nm or so.

Figure 2:
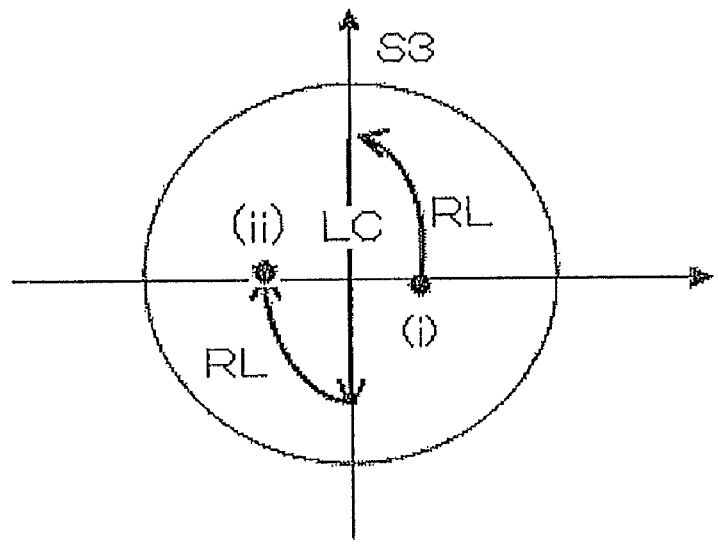
FIG. 2 is a view for explaining the optical compensation in the liquid-crystal display device of the invention.
Figure 3:
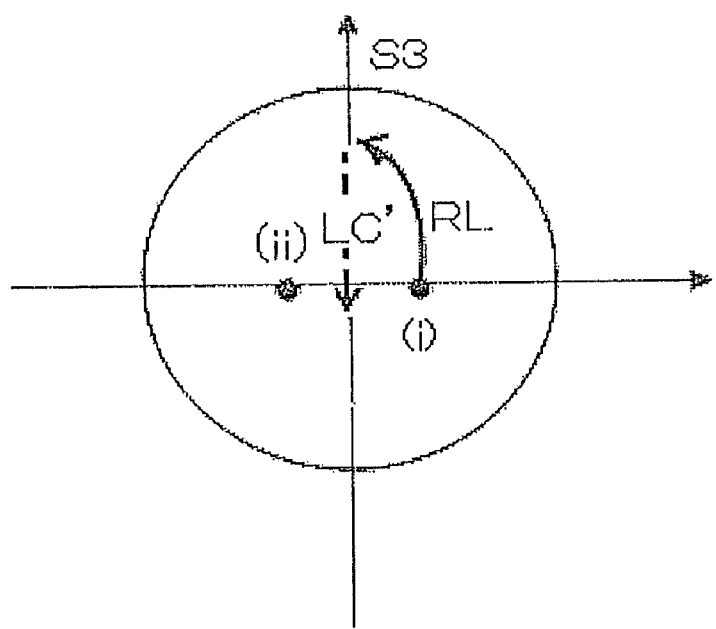
FIG. 3 is a view for explaining the optical compensation in the liquid-crystal display device of the invention.

In an embodiment based on the optical compensation principle similar to that of the VA-mode liquid-crystal display device of FIG. 1, or that is, in an embodiment where the birefringence to occur in the oblique direction in the black state of the liquid-crystal cell LC is compensated by Re and Rth of the two retardation films (like as retardation films 10a and 10b shown in FIG. 1) that have equivalent optical anisotropy and are disposed symmetrically around the center of the liquid-crystal cell, when the polarization state behavior is expressed as the movement on a Poincare sphere, then it may be, for example, as in FIG. 2. The Poincare sphere is a three-dimensional map that describes a polarization state, and the equator of the sphere indicates a polarization state of a linear polarized light having an ellipticity of 0. FIG. 2 is a view showing a Poincare sphere in the positive direction of the S2 axis thereof. The point (i) in FIG. 2 indicates a polarization state of a linear polarized light passing through the polarizing film disposed at the backlight side in the oblique direction in the black state; and when the polarization state point (i) is converted into a polarization state point (ii) which is an extinction point on the S1 axis, then it may solve a problem of contrast reduction in oblique light introduction in a liquid-crystal display device. RL indicates the trace of a polarization state of light that passes through the retardation films symmetrically disposed on and below the liquid-crystal cell; and LC indicates the trace of a polarization state of light that passes through the liquid-crystal cell. Heretofore, in a VA-mode liquid-crystal cell in which retardation films having equivalent optical anisotropy are vertically symmetrically disposed as in FIG. 1, the polarization state of the incident light is converted as a point-symmetric trace as in FIG. 2, thereby reducing the light leakage in oblique directions in the black state. When the thickness of the liquid-crystal layer is reduced for thinning the device, Δnd of the liquid-crystal layer becomes small and the length of the arrow of LC indicating the trace of the conversion of the polarization state of light that passes through the liquid-crystal layer is thereby shortened. For example, even when optical compensation is tried in the same constitution of a thinned liquid-crystal layer (LC') as in FIG. 3, directly using a conventional retardation film as it is, then it is difficult to convert the point (i) to the point (ii) with the symmetric trace as in FIG. 2, since the arrow LC' is shorter than the arrow LC. Accordingly, in the invention, retardation films satisfying the above-mentioned conditions (I) and (II) (in FIG. 1, 10a and 10b) are used, to thereby attain a polarization state conversion mode around a different rotation axis at a different rotation angle, differing from the case of light travel through conventional retardation films, and therefore as a whole, the invention has enabled the polarization state conversion with the point-symmetric trace like conventionally, and has succeeded in reducing the light leakage in oblique directions in the black state. From this viewpoint, in the invention, Re(550) of the retardation film is preferably from 30 to 80 nm, more preferably from 40 to 70 nm; Rth(550) of the retardation film is preferably from 70 to 140 nm, more preferably from 80 to 130 nm.

Figure 4A:
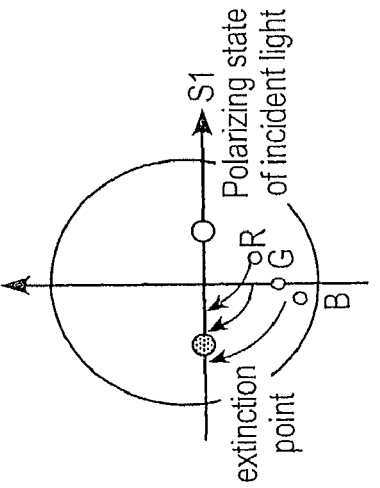
FIGS. 4A-4C are views for explaining the optical compensation in a conventional liquid-crystal display device.
Figure 4B:
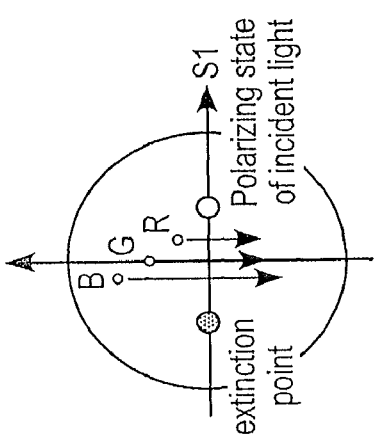
Figure 4C:
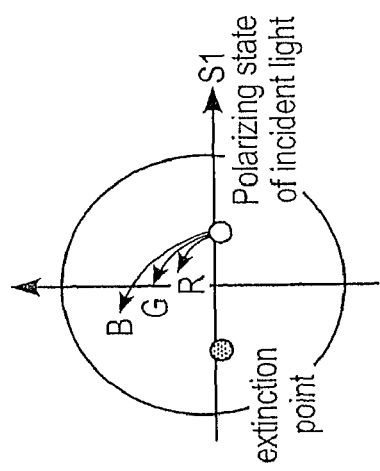

Further according to the invention, the two retardation films, having the same optical anisotropy, differ from each other in terms of the wavelength dispersion characteristics of Re and/or Rth; and thereby the color shift generating in oblique directions in the black state is reduced. The change in the polarization state of light passing through a retardation region is expressed by rotation at a specific angle around a specific axis determined in accordance with the optical characteristics, Nz value (concretely, the value to be obtained by adding 0.5 to Rth/Re) within the retardation region, on a Poincare sphere. The rotation angle (degree of rotation) is proportional to the retardation in the retardation region though which the incident light has passed, and is proportional to the reciprocal number of the wavelength of the incident light. For example, when a retardation film having a constant Re not depending on the wavelength of light is used as the retardation films 10a and 10b in FIG. 1, then, as in FIGS. 4A-4C, the light having a shorter wavelength (for example, blue light, shown by "B" in the drawing) may rotate larger while the light having a longer wavelength (for example, red light, shown by "R" in the drawing) may rotate smaller. As a result, even when the optical characteristics of the retardation film are optimized so that the film could have an extinction point with the green light (at about 550 nm, shown by "G" in the drawing) that has an intermediate wavelength in a visible light region, the film could not convert the polarization state of R light having a longer wavelength (about 650 nm) and B light having a shorter wavelength (about 450 nm) into the extinction point, therefore still having a problem of color shift in oblique direction. This tendency occurs in any disposition of retardation films having equivalent wavelength dispersion characteristics of Re and Rth, as the retardation films 10a and 10b in FIG. 1, irrespective of the wavelength dispersion characteristics of Re and Rth of the retardation films (that is, irrespective of regular or reversed wavelength dispersion characteristics of retardation, or even constant retardation characteristics of the films).

Figure 5A:
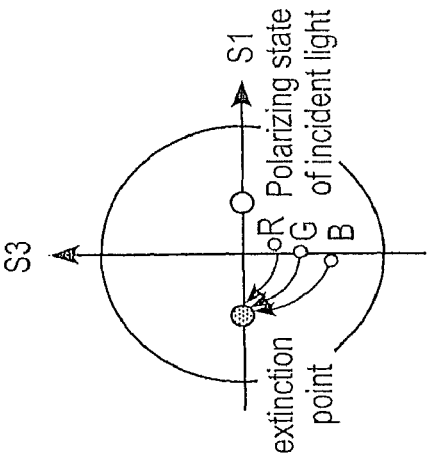
FIGS. 5A-5C are views for explaining the optical compensation in the liquid-crystal display device of the invention.
Figure 5B:
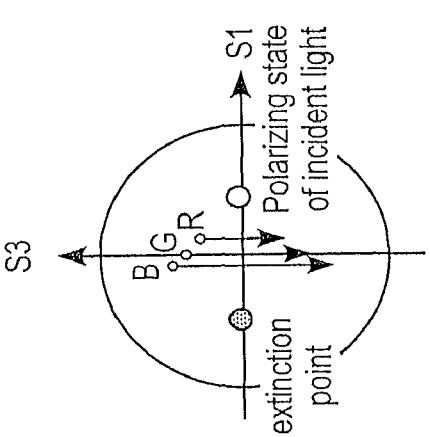
Figure 5C:
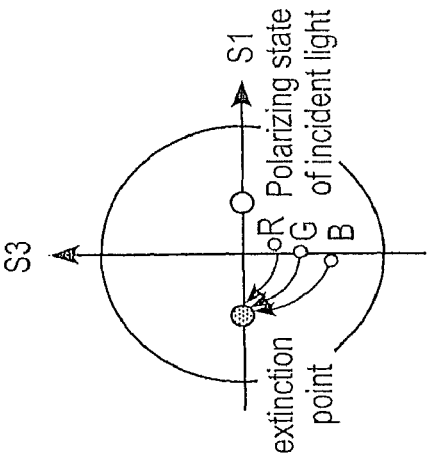
Figures 6A, 6B:
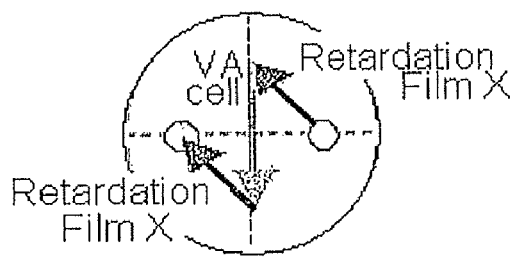
FIG. 6B is a schematic cross-sectional view of a conventional VA-mode liquid-crystal display device.
FIG. 6A is a schematic view of one example of an optical compensation system ("homo" system) in the device.
Figures 7A, 7B:
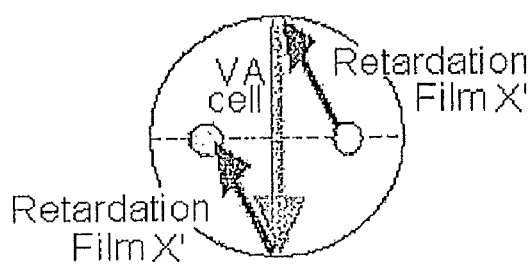
FIG. 7B is a schematic cross-sectional view of a conventional VA-mode liquid-crystal display device.
FIG. 7A is a schematic view of one example of an optical compensation system ("homo" system) in the device.

On the other hand, in the invention, in FIG. 1, the backlight side retardation film 10b and the viewers' side retardation film 10a are equivalent to each other in terms of their Re and Rth for G light and enable the same optical compensation as in FIG. 2 for G light, and further, the two films differ from each other in terms of the wavelength dispersion characteristics of Re and/or Rth. As a result, the shift from the extinction point for B light and R light is reduced in the device, and the device can solve the problem of color shift in oblique directions. One example of the device of FIG. 1 is described, in which a retardation film having regular wavelength dispersion characteristics of Re and Rth is used as the backlight side retardation film 10b, and a retardation film having reversed wavelength dispersion characteristics of Re and Rth is used as the viewers' side retardation film 10a. In this example, on the backlight side, the light having a shorter wavelength may rotate smaller while the light having a longer wavelength may rotate larger, as in FIG. 5A, and therefore, the short wavelength B light (450 nm or so) and the long wavelength R light (650 nm or so) reach nearly the same position as that of G light having an intermediate wavelength (550 nm or so). Next, owing to the optical characteristics of the liquid-crystal cell, the light rotates toward the downside of the Poincare sphere, and as in FIG. 5B, the R light, the G light and the B light reach the position at which they separated. In this stage, the B light, the G light and the R light reach the remoter position from the extinction point in that order (distance from the extinction point: longer side, B light>G light>R light, shorter side). As in FIG. 5C, the light having a shorter wavelength may rotate larger at the viewing side, while the light having a longer wavelength may rotate smaller; and therefore, the short wavelength B light (450 nm or so), the intermediate wavelength G light (550 nm or so) and the long wavelength R light (650 nm or so) may reach almost the extinction point.

As described in the above, when two retardation films that differ from each other in terms of the wavelength dispersion characteristics of Re and/or Rth, irrespective of the type of the wavelength dispersion characteristics (regular or reversed wavelength dispersion characteristics) and the degree of the wavelength dispersion characteristics (concretely, in terms of the above-mentioned degree of inclination), are used in the liquid-crystal display device of the invention, then the device is effective for reducing the color shift in oblique directions, differing from conventional devices where two retardation films having the same wavelength dispersion characteristics of Re and Rth are used. For further enhancing the effect, in the invention, the two retardation films, or that is, the retardation film A and the retardation film B are preferably such that Re or Rth of the retardation film A is any of a regular wavelength dispersion characteristic one or a reversed wavelength dispersion characteristic one or a constant one in a visible light region, and Re or Rth of the retardation film B is any of a regular wavelength dispersion characteristic one or a reversed wavelength dispersion characteristic one or a constant one in a visible light region, but differing from Re or Rth of the retardation film A.

Preferably, of the two retardation films, Re of any one retardation film (retardation film A) satisfies any of the following conditions (III) to (V), while Re of the other retardation film (retardation film B) satisfies any of the following conditions (III) to (V) other than that which Re of the retardation film A satisfies; or preferably, Rth of the retardation film A satisfies any of the following conditions (VI) to (VIII), while Rth of the retardation film B satisfies any of the following conditions (VI) to (VII) other than that which Rth of the retardation film A satisfies.

Preferably, Re of the retardation film A satisfies any of the following conditions (III) to (V) and Re of the other retardation film (retardation film B) satisfies any of the following conditions (III) to (V) other than that which Re of the retardation film A satisfies; and more preferably, Rth of the retardation film A satisfies any of the following conditions (VI) to (VII), and Rth of the retardation film B satisfies any of the following conditions (VI) to (VII) other than that which Rth of the retardation film A satisfies.

Even more preferably, Re of the retardation film A satisfies the following condition (III) and Rth thereof satisfies the following condition (VI), and Re of the retardation film B satisfies the following condition (IV) and Rth thereof satisfies the following condition (VII).

Any of the retardation films A and B may be on the panel side or the backlight side to attain the same effect.

$Re(446)/Re(548)<1$ and $Re(628)/Re(548)>1$ (III)

$Re(446)/Re(548)>1$ and $Re(628)/Re(548)<1$ (IV)

$|Re(446)-Re(628)|/Re(548)<0.03$ (V)

$Rth(446)/Rth(548)<1$ and $Rth(628)/Rth(548)>1$ (VI)

$Rth(446)/Rth(548)>1$ and $Rth(628)/Rth(548)<1$ (VII)

$|Rth(446)-Rth(628)|/Rth(548)<0.0125$ (VIII)

Further, the condition (III) is more preferably the following condition (III)':

$0.80<Re(446)/Re(548)<0.98$ and $1.05>Re(628)/Re(548)>1.001$, (III)' even more preferably, the following condition (III)":

$0.837<Re(446)/Re(548)<0.965$ and $1.045>Re(628)/Re(548)>1.011$ (III)"

Also, the condition (IV) is more preferably the following condition (IV)':

$1.026>Re(446)/Re(548)>1.016$ and $0.992<Re(628)/Re(548)<0.994$ (IV)'

The condition (VI) is more preferably the following condition (VI)':

$0.85<Rth(446)/Rth(548)<0.98$ and $1.05>Rth(628)/Rth(548)>1.008$, (VI)' even more preferably, the following condition (VI)":

$0.891<Rth(446)/Rth(548)<0.965$ and $1.05>Rth(628)/Rth(548)>1.008$ (VI)"

The condition (VII) is more preferably $1.01>Rth(446)/Rth(548)>1.005$ and $0.996<Rth(628)/Rth(548)<0.998$.

In the embodiment where Re of the retardation film A satisfies the condition (III) and Rth thereof satisfies the condition (VI) and where Re of the retardation film B satisfies the condition (IV) and Rth thereof satisfies the condition (VII), preferably they satisfy the above conditions (I)' and (II)', more preferably the above conditions (I)" and (II)".

In the invention, more preferred of the above embodiments is a combination of the retardation film A having regular wavelength dispersion characteristics of Re and Rth and the retardation film B having reversed wavelength dispersion characteristics of Re and Rth, or a combination of the retardation film A having reversed wavelength dispersion characteristics of Re and Rth and the retardation film B having regular wavelength dispersion characteristics of Re and Rth. The reason is described below.

For reducing the light leakage and the color shift in oblique directions in the black state, for example, it is desired that the polarized light with a different wavelength, after having passed through the rear side polarizing plate, the rear side retardation film B, the liquid-crystal cell, and the front side retardation film A, is in parallel to the absorption axis of the front side polarizing plate observed in oblique directions.

This is described on the Poincare sphere. Blue, green and red lights (B, G, R) finally reach the point S1 (extinction point) on the absorption axis of the front side polarizing plate in oblique directions, and the phenomenon can be expressed in a simplified manner.

When the polarization state having passed through each layer is taken into consideration, the linear polarized light through the rear side polarizing plate undergoes rotation on the Poincare sphere, owing to Re of the rear side retardation film B. As the retardation film B has reversed wavelength dispersion characteristics of retardation, the distance of BGR is in a near position (the BGR polarization state is similar to each other).

Next, owing to the regular wavelength dispersion birefringence of the VA liquid-crystal cell (corresponding to negative Rth), the BGR distance becomes remoter (the BGR polarization state becomes different from each other).

Finally, owing to the regular wavelength dispersion characteristics Rth of the front side retardation film A, BGR may gather at the extinction point for compensating the distance that has became remoter through the VA liquid-crystal cell. The same discussion may be made on a different case where the front and rear retardation films are replaced.

For the description relating to the effect and the mechanism of the above-mentioned "homo"-type device or C plate+A plate combination device, the same discussion as the above may be made. However, regarding the ideal wavelength dispersion characteristics of retardation of the retardation films for focusing BGR at the extinction point in a "homo-type" device, it is said that the films are to have reversed wavelength dispersion characteristics of Re and have regular wavelength dispersion characteristics of Rth. However, it is extremely difficult to produce such a retardation film having reversed wavelength dispersion characteristics of Re and at the same time having regular wavelength dispersion characteristics of Rth; and the latitude in producing the film of the type is narrow and the production cost for it is high. Accordingly, at present, films having the same wavelength dispersion characteristics of Re and Rth are used in the art. In the C plate+A plate combination device, the C plate must have regular wavelength dispersion characteristics of retardation, but it is extremely difficult to produce the C plate having such characteristics, and the latitude in producing the C plate of the type is narrow and the production cost for it is high. Accordingly, at present, the C plate generally used in the art is one having weak wavelength dispersion characteristics of retardation. For reducing the color shift in a simplified manner, the above-mentioned "hetero"-type combination is especially preferred.

According to the invention, preferable is an embodiment of a VA-mode liquid-crystal display device. Of the VA-mode, more preferred is a multidomain structure in which one pixel is divided into plural regions, as the horizontal and vertical viewing angle characteristics of the structure are averaged and its display quality is good.

Depending on the driving mode thereof, the liquid-crystal display device of the invention includes different applications of an active matrix liquid-crystal display device comprising a 3-terminal or 2-terminal semiconductor element such as TFT (thin film transistor) or MIM (metal insulator metal), and a passive matrix liquid-crystal display device such as typically an STN-mode referred to as time sharing drive; and the invention is effective in all of these.

Various members which can be used in the liquid-crystal display device of the invention are described in detail hereinunder.

[Retardation Films A and B]

The retardation films A and B for use in the invention are not specifically defined in terms of their materials, so far as they satisfy the above-mentioned requirements. When the retardation films A and B are polymer films, then they may stuck to a polarizing element. As a single member, they may be built in the liquid-crystal display device of the invention, for example, as an optical compensatory film therein. Regarding the material for the polymer film, preferred are polymers excellent in the optical properties, transparency, mechanical strength, thermal stability, water shieldability and isotropy; however any material satisfying the above-mentioned requirements may be used herein. For example, examples of the material include polycarbonate polymers; polyester polymers such as polyethylene terephthalate and polyethylene naphthalate; acrylic polymers such as polymethyl methacrylate; styrenic polymers such as polystyrene and acrylonitrile/styrene copolymer (AS resin); etc. As examples of the material, also mentioned are polyolefins such as polyethylene and polypropylene; polyolefinic polymers such as ethylene/propylene copolymer; vinyl chloride-based polymers; amide polymers such as nylon and aromatic polyamide; imide polymers, sulfone polymers, polyether sulfone polymers, polyether ether ketone polymers, polyphenylene sulfide polymers, vinylidene chloride polymers, vinyl alcohol polymers, vinyl butyral polymers, arylate polymers, polyoxymethylene polymers, epoxy polymers; and mixtures of the above-mentioned polymers.

As the material to form the polymer film, preferably used is a thermoplastic norbornene resin. The thermoplastic norbornene resin includes Nippon Zeon's ZEONEX, ZEONOR; JSR's ARTON; etc. These are stretched to produce the above-mentioned retardation films A and B.

As the material to form the polymer film, also preferably used is a cellulose polymer (this is referred to as cellulose acylate) heretofore generally used as a transparent protective film for polarizing plates. The retardation films A and B for use in the invention satisfy the above-mentioned conditions (I) and (II). Heretofore, a cellulose acylate film comprising a cellulose acylate as the main ingredient thereof could hardly attain the optical characteristics of the above-mentioned conditions (I) and (II). For example, when Re is increased to satisfy the above condition (I), then Rth of the condition (II) may be over the uppermost value (140 nm); and it is difficult to produce a cellulose acylate film satisfying both the conditions (I) and (II) at the same time. Even though a film satisfying both the two could be produced, it still has a problem in that it is extremely thin. Accordingly, as described hereinunder, it is desirable that an additive such as a liquid-crystal compound or the like is added to the polymer and the intended cellulose acylate film satisfying the conditions (I) and (II) is produced and is used as the retardation films A and B.

Cellulose Acylate:

Representative examples of the cellulose acylate to be used for preparing the retardation films include triacetyl cellulose. A cellulose as a raw material for cellulose acylate is a cotton linter, a wood pulp (a needle leaf tree pulp or a broad leaf tree pulp), or the like. Cellulose acylate obtained from any raw material cellulose can be used. A plurality of raw material celluloses may be mixed as required. The raw material cellulose described in, for example, Maruzawa & Uda, Plastic Material Lecture (17) Cellulosic Resin, by Nikkan Kogyo Shinbun (1970); and Hatsumei Kyokai's Disclosure Bulletin No. 2001-1745 (pp. 7-8), can be used. There is no specific limitation on the raw material for the cellulose acylate film.

The degree of substitution of cellulose acylate means the ratio of acylation for three hydroxyl groups in a cellulose unit (($\beta$)1,4-glycoside bonded glucose). The degree of substitution (the ratio of acylation) can be calculated based on the amount of fatty acids combining with a cellulose unit. The measurement is carried out according to the method described in ASTM: D-817-91.

Preferred examples of the cellulose acylate to be used for preparing the retardation films include cellulose acetates having the degree of acetyl-substitution falling within the range from 2.50 to 3.00. The degree of acetyl-substitution is preferably 2.70 to 2.97. The cellulose acylate(s) having the acyl group(s) other than the acetyl group together with or in place of the acetyl group may be used. Among such cellulose acylates, cellulose acylates having at least one acyl group selected from an acetyl group, a propionyl group and a butyryl group are preferable; and cellulose acylates having at least two acyl groups selected from an acetyl group, a propionyl group and a butyryl group are more preferable.

The cellulose acylate has preferably a mass average degree of polymerization of 350 to 800, and more preferably a mass average degree of polymerization of 370 to 600. The cellulose acylate used in the present invention has preferably an average molecular weight of 70000 to 230000, more preferably 75000 to 230000, and still more preferably 78000 to 120000.

The cellulose acylate can be synthesized using an acid anhydride or an acid chloride as an acylation agent. In a synthesizing method which is most general in the industry, the cellulose obtained from cotton linter or wood pulp is esterified to a mixed organic acid component containing an organic acid (acetic acid, propionic acid, or butyric acid) corresponding to other acyl groups and an acetyl group, or acid anhydride (acetic acid anhydride, propionic acid anhydride, or butyric acid anhydride) to synthesize the cellulose ester.

The cellulose acylate film is preferably produced according to a solvent cast method. Examples of preparation of the cellulose acylate film according to the solvent cast method may include U.S. Pat. Nos. 2,336,310, 2,367,603, 2,492,078, 2,492,977, 2,492,978, 2,607,704, 2,739,069, and 2,739,070, British Patent Nos. 640731 and 736892, JPB Nos. syo 45-4554 and syo 49-5614, and JPA Nos. syo 60-176834, syo 60-203430, and syo 62-115035. The cellulose acylate film may be stretched. A method of stretching the cellulose acylate film and the condition thereof are disclosed in JPA Nos. syo 62-115035, hei 4-152125, hei 4-284211, hei 4-298310, and hei 11-48271.

It is to be noted that additives such as liquid crystal compounds described hereinafter may be added to a solution of a cellulose acylate composition when the cellulose acylate film is prepared according to the solvent cast method. For example, a solution prepared by dissolving additives such as liquid crystal compounds may be added to a solution of a cellulose acylate composition.

The retardation films preferably contain cellulose acylate(s) as a major ingredient.

For preparing the cellulose acylate films having the optical properties required for the retardation film A or B, the cellulose acylate composition containing at least any one of ingredients described hereinunder is preferably used for preparing such cellulose acylate films.

Discotic Compound:

Preferably, at least one discotic compound having an absorption peak at a wavelength falling within the range from 250 nm to 380 nm is added to the cellulose acylate film for use as the retardation film. The discotic compound may be liquid-crystalline or non-liquid-crystalline. Preferably, a liquid-crystal compound is used along with the discotic compound (preferably a liquid crystal compound represented by formula (A) and/or a liquid crystal compound represented by formula (a)), as capable of controlling the development of retardation (Re and Rth) and as effective for facilitating the dissolution of the liquid-crystal compound.

The content of the discotic compound having an absorption peak at a wavelength falling within the range from 250 nm to 380 nm in the film is preferably from 0.1 to 30% by mass relative to the main ingredient, cellulose acylate, in the film, more preferably from 1 to 25% by mass, even more preferably from 3 to 15% by mass. Within the range, the compound does not cause a problem of bleeding out, and can favorably attain its effect.

Liquid-Crystal Compound:

In the invention, for producing the cellulose acylate film that satisfies the requirements for retardation films, at least one liquid-crystal compound serving as an Re enhancer is added to the cellulose acylate film. "Re enhancer" as referred to herein is a compound having the property of expressing an in-plane birefringence of film.

The liquid-crystal compound for use in the invention expresses a liquid-crystal phase preferably within a temperature range of from 100° C. to 300° C., more preferably from 120° C. to 250° C. The liquid-crystal phase is preferably a columnar phase, a nematic phase or a smectic phase, more preferably a nematic phase or a smectic phase.

In the invention, plural liquid-crystal compounds may be used. In that case, it is desirable that the mixture of plural liquid-crystal compounds still exhibits liquid crystallinity, and preferably, even the mixture could form the same liquid-crystal phase as the liquid-crystal phase of the individual liquid-crystal compounds.

In this description, the evaluation for liquid crystallinity of the liquid-crystal compound to be used as a retardation enhancer may be attained as follows: Using a polarizing microscope Eclipse E600POL (by Nikon), a compound is visually checked for the liquid-crystal condition thereof, and its phase transition temperature is measured. For the temperature control, used is a hot stage FP82HT (by Mettler Toledo) connected to FP90 (by Mettler Toledo), and from the optical texture change observed with a polarizing microscope, the liquid-crystal phase is identified.

A liquid-crystal compound is metered and taken into a sample bottle, and this is dissolved in an organic solvent (e.g., methylene chloride) to form a uniform solution, and then the solvent is removed by evaporation.

A sample of the compound for evaluation for liquid crystallinity, prepared in the manner as above, is sandwiched between a slide glass and a cover glass, and on the hot stage, this is heated at a speed of 10° C./min, whereupon the change of the sample with the lapse of time is observed with the polarizing microscope.

As a result, when the compound tested forms a liquid-crystal phase, then it is determined that the compound has liquid crystallinity; and when it does not form a uniform liquid-crystal phase but forms an isotropic phase or an ununiform phase, then it is determined that the compound does not have liquid crystallinity.

The content of the liquid-crystal compound in the film is preferably from 0.1 to 30% by mass relative to the main ingredient, cellulose acylate, in the film, more preferably from 1 to 25% by mass, even more preferably from 3 to 15% by mass. Within the range, the compound is effective not causing a problem of bleeding out.

The cellulose acylate film used as the retardation film A or B preferably contains at least one liquid crystal compound represented by formula (A). By using the liquid crystal compound(s) represented by formula (A), the retardation film, having increased retardation and showing the reversed wavelength dispersion characteristics of retardation, may be prepared.

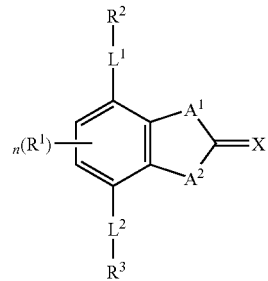

Formula (A)

In the formula, $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

Among the compounds represented by the formula (A), the compounds represented by the formula (B) are preferred as a retardation enhancer.

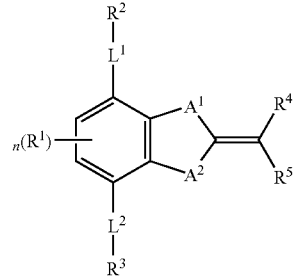

Formula (B)

In the formula (B), $L^1$ and $L^2$ independently represent a single bond or a divalent group. $A^1$ and $A^2$ independently represent a group selected from the group consisting of —O—, —NR— where R represents a hydrogen atom or a substituent, —S— and —CO—. $R^1$, $R^2$ and $R^3$ independently represent a substituent. And n is an integer from 0 to 2.

Preferred examples of the divalent linking group represented by $L^1$ or $L^2$ in the formula (A) or (B) include those shown below.

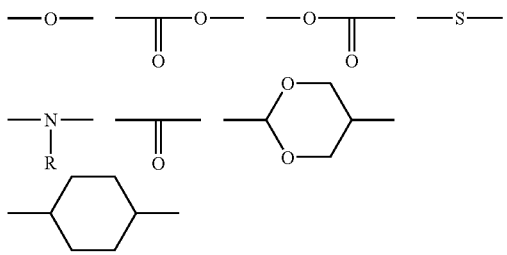

And further preferred are —O—, —COO— and —OCO—.

In the formulae (A) and (B), $R^1$ represents a substituent, if there are two or more R, they may be same or different from each other, or form a ring. Examples of the substituent include those shown below.

Halogen atoms such as fluorine, chlorine, bromine and iodine atoms; alkyls (preferably $C_{1-30}$ alkyls) such as methyl, ethyl, n-propyl, iso-propyl, tert-butyl, n-octyl, and 2-ethylhexyl; cycloalkyls (preferably $C_{3-30}$ substituted or non-substituted cycloalkyls) such as cyclohexyl, cyclopentyl and 4-n-dodecylcyclohexyl; bicycloalkyls (preferably $C_{5-30}$ substitute or non-substituted bicycloalkyls, namely monovalent residues formed from $C_{5-30}$ bicycloalkanes from which a hydrogen atom is removed) such as bicyclo[1,2,2]heptane-2-yl and bicyclo[2,2,2]octane-3-yl; alkenyls (preferably $C_{2-30}$ alkenyls) such as vinyl and allyl; cycloalkenyls (preferably $C_{3-30}$ substituted or non-substituted cycloalkenyls, namely monovalent residues formed from $C_{3-30}$ cycloalkenes from which a hydrogen atom is removed) such as 2-cyclopentene-1-yl and 2-cyclohexene-1-yl; bicycloalkenyls (preferably $C_{5-30}$ substituted or non-substituted bicycloalkenyls, namely monovalent residues formed from $C_{5-30}$ bicycloalkenes from which a hydrogen atom is removed) such as bicyclo[2,2,1]hepto-2-en-1-yl and bicyclo[2,2,2]octo-2-en-4-yl; alkynyls (preferably $C_{2-30}$ substitute or non-substituted alkynyls) such as etynyl and propargyl; aryls (preferably $C_{6-30}$ substitute or non-substituted aryls) such as phenyl, p-tolyl and naphthyl; heterocyclic groups (preferably (more preferably $C_{3-30}$) substituted or non-substituted, 5-membered or 6-membered, aromatic or non-aromatic heterocyclic monovalent residues) such as 2-furyl, 2-thienyl, 2-pyrimidinyl and 2-benzothiazolyl; cyano, hydroxyl, nitro, carboxyl, alkoxys (preferably $C_{1-30}$ substituted or non-substituted alkoxys) such as methoxy, ethoxy, iso-propoxy, t-butoxy, n-octyloxy and 2-methoxyethoxy; aryloxys (preferably $C_{6-30}$ substituted or non-substituted aryloxys) such as phenyloxy, 2-methylphenoxy, 4-t-butylphenoxy, 3-nitrophenoxy and 2-tetradecanoyl phenoxy; silyloxys (preferably $C_{3-20}$ silyloxys) such as trimethylsilyloxy and t-butyldimethylsilyloxy; hetero-cyclic-oxys (preferably $C_{2-30}$ substituted or non-substituted hetero-cyclic-oxys) such as 1-phenyltetrazole-5-oxy and 2-tetrahydropyrenyloxy; acyloxys (preferably $C_{2-30}$ substitute or non-substituted alkylcarbonyloxys and $C_{6-30}$ substituted or non-substituted arylcarbonyloxys) such as formyloxy, acetyloxy, pivaloyloxy, stearoyoxy, benzoyloxy and p-methoxyphenylcarbonyloxy; carbamoyloxys (preferably $C_{1-30}$ substituted or non-substituted carbamoyloxys) such as N,N-dimethyl carbamoyloxy, N,N-diethyl carbamoyloxy, morpholinocarbonyloxy, N,N-di-n-octylaminocarbonyloxy and N-n-octylcarbamyloxy; alkoxy carbonyloxys (preferably $C_{2-30}$ substituted or non-substituted alkoxy carbonyloxys) such as methoxy carbonyloxy, ethoxy carbonyloxy, t-butoxy carbonyloxy and n-octyloxy carbonyloxy; aryloxy carbonyloxys (preferably $C_{7-30}$ substituted or non-substituted aryloxy carbonyloxys) such as phenoxy carbonyloxy, p-methoxyphenoxy carbonyloxy and p-n-hexadecyloxyphenoxy carbonyloxy; aminos (preferably $C_{0-30}$ substituted or non-substituted alkylaminos and $C_{6-30}$ substituted or non-substituted arylaminos) such as amino, methylamino, dimethylamino, anilino, N-methylanilino and diphenylamino; acylaminos (preferably $C_{1-30}$ substituted or non-substituted alkylcarbonylaminos and $C_{6-30}$ substituted or non-substituted arylcarbonylaminos) such as formylamino, acetylamino, pivaloylamino, lauroylamino and benzoylamino; aminocarbonylaminos (preferably $C_{1-30}$ substituted or non-substituted aminocarbonylaminos) such as carbamoylamino, N,N-dimethylaminocarbonylamino, N,N-diethylamino carbonylamino and morpholino carbonylamino; alkoxycarbonylaminos (preferably $C_{2-30}$ substituted or non-substituted alkoxycarbonylaminos) such as methoxycarbonylamino, ethoxycarbonylamino, t-butoxycarbonylamino, n-octadecyloxycarbonylamino and N-methyl-methoxy carbonylamino; aryloxycarbonylaminos (preferably $C_{7-30}$ substituted or non-substituted aryloxycarbonylaminos) such as phenoxycarbonylamino, p-chloro phenoxycarbonylamino and m-n-octyloxy phenoxy carbonylamino; sulfamoylaminos (preferably $C_{0-30}$ substituted or non-substituted sulfamoylaminos) such as sulfamoylamino, N,N-dimethylamino sulfonylamino and N-n-octylamino sulfonylamino; alkyl- and aryl-sulfonylaminos (preferably $C_{1-30}$ substituted or non-substituted alkyl-sulfonylaminos and $C_{6-30}$ substituted or non-substituted aryl-sulfonylaminos) such as methyl-sulfonylamino, butyl-sulfonylamino, phenyl-sulfonylamino, 2,3,5-trichlorophenyl-sulfonylamino and p-methylphenyl-sulfonylamino; mercapto; alkylthios (preferably substituted or non-substituted $C_{1-30}$ alkylthios such as methylthio, ethylthio and n-hexadecylthio; arylthios (preferably $C_{6-30}$ substituted or non-substituted arylthios) such as phenylthio, p-chlorophenylthio and m-methoxyphenylthio; heterocyclic-thios (preferably $C_{2-30}$ substituted or non-substituted heterocyclic-thios such as 2-benzothiazolyl thio and 1-phenyltetrazol-5-yl-thio; sulfamoyls (preferably $C_{0-30}$ substituted or non-substituted sulfamoyls) such as N-ethylsulfamoyl, N-(3-dodecyloxypropyl)sulfamoyl, N,N-dimethylsulfamoyl, N-acetylsulfamoyl, N-benzoylsulfamoyl, N—(N'-phenylcarbamoyl)sulfamoyl; sulfo; alkyl- and aryl-sulfinyls (preferably $C_{1-30}$ substituted or non-substituted alkyl- or $C_{6-30}$ substituted or non-substituted aryl-sulfinyls) such as methylsulfinyl, ethylsulfinyl, phenylsulfinyl and p-methylphenylsulfinyl; alkyl- and aryl-sulfonyls (preferably $C_{1-30}$ substituted or non-substituted alkyl-sulfonyls and $C_{6-30}$ substituted or non-substituted arylsulfonyls) such as methylsulfonyl, ethylsulfonyl, phenylsulfonyl and p-methylphenylsulfonyl; acyls (preferably $C_{2-30}$ substituted non-substituted alkylcarbonyls, and $C_{7-30}$ substituted or non-substituted arylcarbonyls) such as formyl, acetyl and pivaloyl benzyl; aryloxycarbonyls (preferably $C_{7-30}$ substituted or non-substituted aryloxycarbonyls) such as phenoxycarbonyl, o-chlorophenoxycarbonyl, m-nitrophenoxycarbonyl and p-t-butylphenoxycarbonyl; alkoxycarbonyls (preferably $C_{2-30}$ substituted or non-substituted alkoxycarbonyls) methoxycarbonyl, ethoxycarbonyl, t-butoxycarbonyl and n-octadecyloxycarbonyl; carbamoyls (preferably $C_{1-30}$ substituted or non-substituted carbamoyls) such as carbamoyl, N-methylcarbamoyl, N,N-dimethylcarbamoyl, N,N-di-n-octylcarbamoyl and N-(methylsulfonyl)carbamoyl; aryl- and heterocyclic-azos (preferably $C_{6-30}$ substituted or non-substituted arylazos and $C_{3-30}$ substituted or non-substituted heterocyclicazos) such as phenylazo and p-chlorophenylazo, 5-ethylthio-1,3,4-thiadiazol-2-yl-azo, imides such as N-succinimide and N-phthalimide; phosphinos (preferably $C_{2-30}$ substituted or non-substituted phosphinos) such as dimethyl phosphino, diphenyl phosphino and methylphenoxy phosphino; phosphinyls (preferably $C_{2-30}$ substituted or non-substituted phosphinyls) such as phosphinyl, dioctyloxy phosphinyl and diethoxy phosphinyl; phosphinyloxys (preferably $C_{2-30}$ substituted or non-substituted phosphinyloxys) such as diphenoxyphosphinyloxy and dioctyloxyphosphinyloxy; phosphinylaminos (preferably $C_{2-30}$ substituted or non-substituted phosphinylaminos) such as dimethoxy phosphinylamino and dimethylamino phosphinylamino; and silyls (preferably $C_{3-30}$ substituted or non-substituted silyls) such as trimethylsilyl, t-butylmethylsilyl and phenyldimethylsilyl.

The substituents, which have at least one hydrogen atom, may be substituted by at least one substituent selected from these. Examples such substituent include alkylcarbonylaminosulfo, arylcarbonylaminosulfo, alkylsulfonylaminocarbonyl and arylsulfonylaminocarbonyl. More specifically, methylsulfonylaminocarbonyl, p-methylphenylsulfonylaminocarbonyl, acetylaminosulfonyl and benzoylaminosulfonyl are exemplified.

Preferably, $R^1$ represents a hydrogen atom, an alkyl group, an alkenyl group, an aryl group, a heterocyclic group, hydroxyl, carboxyl, an alkoxy group, an acyloxy group, cyano or an amino group; and more preferably, a halogen atom, an alkyl group, cyano or an alkoxy group.

$R^2$ and $R^3$ independently represent a substituent. Examples of the substituent include those exemplified above as examples of $R^1$. Preferably, $R^2$ and $R^3$ independently represent a substituted or non-substituted phenyl or a substituted or non-substituted cyclohexyl; more preferably, a substituted phenyl or a substituted cyclohexyl; and much more preferably, a phenyl having a substituent at a 4-position or a cyclohexyl having a substituent at a 4-position.

$R^4$ and $R^5$ independently represent a substituent. Examples of the substituent include those exemplified above as examples of $R^1$. Preferably, $R^4$ and $R^5$ independently represent an electron-attractant group having the Hammett value, $\sigma_p$, more than 0; more preferably an electron-attractant group having the Hammett value, $\sigma_p$, from 0 to 1.5. Examples of such an electron-attractant group include trifluoromethyl, cyano, carbonyl and nitro. $R^4$ and $R^5$ may bind to each other to form a ring.

It is to be noted that, regarding Hammett constant of the substituent, $\sigma_p$ and $\sigma_m$, there are detailed commentaries on the Hammett constant of the substituent, $\sigma_p$ and arm in "Hammett Rule-Structure and Reactivity-(Hammeto soku -Kozo to Hanohsei)" published by Maruzen and written by Naoki Inamoto; "New Experimental Chemistry 14 Synthesis and Reaction of Organic Compound V (Shin Jikken Kagaku Koza 14 Yuuki Kagoubutsu no Gousei to Hannou)" on p. 2605, edited by Chemical Society of Japan and published by Maruzen; "Theory Organic Chemistry Review (Riron Yuuki Kagaku Gaisetsu)" on p. 217, published by TOKYO KAGAKU DOZIN CO. LTD., and written by Tadao Nakatani; and Chemical Reviews, Vol. 91, No. 2, pp. 165-195 (1991).

In the formula, $A^1$ and $A^2$ independently represent a group selected from the group consisting of —O—, —NR— where R represents a hydrogen atom or a substituent, —S— and —CO—; and preferably, —O—, —NR— where R represents a substituent selected from those exemplified above as examples of $R^1$, or —S—.

In the formula, X represents a nonmetal atom selected from the groups 14-16 atoms, provided that X may bind with at least one hydrogen atom or substituent. Preferably, X represents =O, =S, =NR or =C(R)R where R represents a substituent selected from those exemplified as examples of $R^1$.

In the formula, n is an integer from 0 to 2, and preferably 0 or 1.

Examples of the compound represented by formula (A) or (B) include Compounds (1)-(108) and Compound (117)-(120) described in JPA No. 2007-249180, [0056]-[0061]. These compounds can be prepared according to the synthetic route described in JPA No. 2007-249180, [0064]-[0067].

Rod-Like Compound:

The cellulose acylate film used as the retardation film A or B preferably contains at least one rod-like compound represented by formula (a) in place of or together with liquid crystal compound (preferably the liquid crystal compound represented by formula (A)). The rod like compound may be selected from liquid crystal compounds or non-liquid crystal compounds; and liquid crystal compounds are preferable. The rod-like compound may contribute to enhancing retardation since its molecules are aligned with molecules of the liquid crystal compound, and further may contribute to improving solubility of the liquid crystal compound in the film.

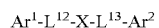
Formula (a):

In the formula (a), $Ar^1$ and $Ar^2$ independently represent an aromatic group; $L^{12}$ and $L^{13}$ independently represent —O—CO— or —CO—O—; and X represents 1,4-cyclohexylen, vinylene or ethynylene.

In the description, the term "aromatic group" is used for any aryl groups (aromatic hydrocarbon groups), substituted aryl groups, aromatic heterocyclic groups and substituted aromatic heterocyclic groups.

Aryl groups and substituted aryl groups are preferred to heterocyclic groups and substituted heterocyclic groups. The hetero rings in the aromatic heterocyclic groups are generally unsaturated. The hetero-rings are preferably 5-, 6- or 7-membered rings. The hetero-rings in the aromatic heterocyclic groups generally have the maximum number of double bonds. The hetero atom(s) embedded in the hetero-ring is preferably selected from the group consisting of nitrogen, oxygen and sulfur atoms, and is more preferably a nitrogen or sulfur atom.

Examples of the aromatic group include radicals of a benzene ring, furan ring, thiophene ring, pyrrole ring, oxazole ring, thiazole ring, imidazole ring, triazole ring, pyridine ring, pyrimidine ring and pyrazine ring; and a radical of a benzene ring, phenyl, is more preferable.

Examples of the substituent in the substituted aryl group or substituted heterocyclic group include halogen atoms (F, Cl, Br and I), hydroxyl, carboxyl, cyano, amino, alkylaminos such as methyl amino, ethylamino, butylamino and dimethylamino; nitro, sulfo, carbamoyl, alkylcarbamoys such as N-methyl carbamoyl, N-ethyl carbamoyl and N,N-dimethyl carbamoyl; sulfamoyl, alkylsulfamoyls such as N-methyl sulfamoyl, N-ethyl sulfamoyl and N,N-dimethyl sulfamoyl; ureido, alkylureidos such as N-methyl ureido, N,N-dimethyl ureido, and N,N,N'-trimethyl ureido; alkyls such as methyl, ethyl, propyl, butyl, pentyl, heptyl, octyl, isopropyl, s-butyl, t-amyl, cyclohexyl and cyclopentyl; alkenyls such as vinyl, allyl and hexenyl; alkynyls such as ethynyl and butynyl; acyls such as formyl, acetyl, butyryl, hexanoyl and lauryl; acyloxys such as acetoxy, butyryloxy, hexanoyloxy and lauryloxy; alkoxys such as methoxy, ethoxy, propoxy, butoxy, pentyloxy, heptyloxy and octyloxy; aryloxys such as phenoxy; alkoxycarbonyls such as methoxycarbonyl, ethoxycarbonyl, propoxycarbonyl, butoxycarbonyl, pentyloxycarbonyl and heptyloxycarbonyl; aryloxycarbonyls such as phenoxycarbonyl; alkoxycarbonylaminos such as butoxy carbonylamino and hexyloxy carbonylamino; alkylthios such as methylthio, ethylthio, propylthio, butylthio, pentylthio, heptylthio and octylthio; arylthios such as phenylthio; alkylsulfonyls such as methylsulfonyl, ethylsulfonyl, propylsulfonyl, butylsulfonyl, pentylsulfonyl, heptylsulfonyl and octylsulfonyl; amidos such as acetoamido, butylamido, hexylamido and laurylamido; and non-aromatic heterocyclic groups such as morpholino and pyrazinyl. As the substituent in the substituted aryl groups or the substituted aromatic heterocyclic groups, halogen atoms, cyano, carboxyl, hydroxyl, amino, alkyl-substituted aminos, acyl, acyloxys, amidos, alkoxycarbonyls, alkoxys, alkylthios and alkyls are preferable.

The alkyl moieties in the alkylaminos, alkoxycarbonyls, alkoxys and alkylthios, and alkyls may have one or more substituents. Examples of the substituent in the alkyl moieties or alkyls include halogen atoms, hydroxyl, carboxyl, cyano, amino, alkylaminos, nitro, sulfo, carbamoyl, alkylcarbamoyls, sulfamoyl, alkylsulfamoyls, ureido, alkylureidos, alkenyls, alkynyls, acyls, acyloxys, acylaminos, alkoxys, aryloxys, alkoxycarbonyls, aryloxycarbonyls, alkoxycarbonylaminos, alkylthios, arylthios, alkylsulfonyls, amidos and non-aromatic heterocyclic groups. As the substituent in the alkyl moieties or alkyls, halogen atoms, hydroxyl, amino, alkylaminos, acyls, acyloxys, acylaminos, alkoxycarbonyls and alkoxys are preferable.

In formula (a), $L^{12}$ and $L^{13}$ each independently represent a divalent group selected from the group consisting of —O—CO—, —CO—O— and any combinations thereof.

In formula (a), X represents 1,4-cyclohexylene, vinylene or ethynylene.

Specific examples of the compound represented by formula (a) include Compounds (1)-(45) described in JPA No. 2006-89529, [0037]-[0047], and trans- and cis-substances thereof.

As described above, the rod-like compound is preferably selected from compounds having linear molecular structure. Therefore, trans-substances are preferred to cis-substances.

Compounds (2) and (3), described in JPA No. 2006-89529, [0037], have four types of isomers including not only geometric isomers but also enantiomers. Among the geometric isomers, trans-substances are preferred to cis-substances. Enantiomers such as D-, L- and racemic-substances are nearly equally preferred.

Compounds (43)-(45), described in JPA No. 2006-89529, [0045], have trans- and cis-forms with a vinylene bond as a center. Because of the same reason, trans-substances are preferred to the cis-substances.

In the invention, the liquid crystal compound may be selected from compounds having a polymerizable group which are polymerizable or curable under irradiation of light or heat. Such a compound may be aligned in the film, and then polymerize, to thereby be in a stable state in the film.

The polymerizable liquid crystal compound may be used with a low-molecular weight compound(s) such as photopolymerization initiator.

Molecules of the liquid crystal compound in the film are aligned with a degree of orientation higher than that of molecules of the cellulose acylate contained in the film as a major ingredient; and therefore, by using a liquid crystal compound as an Re enhancer, the film showing higher Re can be obtained. The liquid crystal compound to be used as an Re enhancer may be added to the cellulose acylate composition with one or more additives, which are optionally used. Preferably, the liquid crystal compound is dissolved in an organic solvent such as alcohol, methylene chloride and dioxolane once; and then the solution is added to the polymer solution (preferably cellulose acylate solution). The amount of the liquid crystal compound is preferably from 5 to 100% by mass, and more preferably from 50 to 100% by mass with respect to the total mass of all of the additives. And the amount of the liquid crystal compound is preferably from 0.1 to 30% by mass, more preferably from 0.5 to 20% by mass, and even more preferably from 1 to 10% by mass with respect to the total mass of the cellulose acylate composition.

In the embodiments employing the cellulose acylate composition containing not only the liquid crystal compound but also the rod-like compound, the amount of the rod-like compound is preferably from 0.1 to 30% by mass, more preferably from 0.5 to 20% by mass and even more preferably from 1 to 10% by mass with respect to the total mass of the cellulose acylate composition.

In the embodiments employing the cellulose acylate composition containing not only the liquid crystal compound but also the discotic compound, the amount of the rod-like compound is preferably from 0.1 to 30% by mass, more preferably from 0.5 to 20% by mass and even more preferably from 1 to 10% by mass with respect to the total mass of the cellulose acylate composition.

In the invention, the thickness of the retardation film A or B is not limited to any specific range, and, in terms of thinning, the thickness is preferably equal to or less than 100 μm, more preferably equal to or less than 80 μm, and even more preferably equal to or less than 60 μm. In terms of thinning, the less thickness is more preferable; however, generally, the thickness of a polymer film is equal to or more than 30 μm.

One example of the retardation film to be used in the invention is a retardation film having the reversed wavelength dispersion characteristics of both of Re and Rth. The retardation films having the reversed wavelength dispersion characteristics of both of Re and Rth may be prepared by using the cellulose acylate composition containing at least one compound represented by formula (A).

Rth Enhancer

In order to prepare a cellulose acylate film which satisfies the conditions of the retardation films to be used in the invention, an Rth enhancer is preferably added to the cellulose acylate film. Here, the term of Rth enhancer is used for any compounds having a property which enhances birefringence along thickness direction of the film.

As the Rth enhancer, a compound having large polarizability anisotropy having an absorption maximum in a wavelength range of 250 nm to 380 nm is preferred. The compounds represented by formula (I) are preferably used as the Rth enhancer.

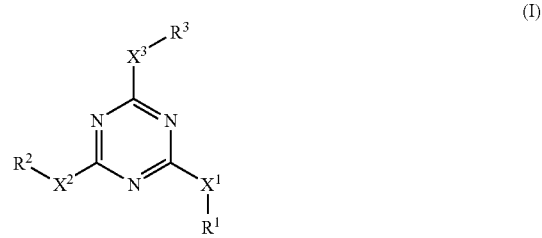

(I)

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring group; $R^4$, $R^5$ and $R^6$ independently represent a hydrogen atom, an alkyl group, an alkenyl group, an aryl group or a hetero-ring group.

Examples of the compound represented by formula (I) include, but are not limited to, Compounds I-(1) to IV-(10) described in JPA No. 2007-86748, [0039]-[0051].

For improving the mechanical properties or promoting the drying rate, one or more plasticizers may be added to the cellulose acylate film to be used as the retardation film A or B. As the plasticizer, phosphates or carboxylates may be used. Examples of such phosphate include triphenyl phosphate (TPP) and tricresyl phosphate (TCP). Representative examples of such carboxylate are phthalic esters and citric esters. Examples of phthalic esters include dimethyl phthalate (DMP), diethyl phthalate (DEP), dibutyl phthalate (DBP), dioctyl phthalate (DOP), diphenyl phthalate (DPP), and diethylhexyl phthalate (DEHP). Examples of citric esters include triethyl o-acetylcitrate (OACTE) and tributyl o-acetylcitrate (OACTB). Examples of other carboxylate include butyl oleate, methylacetyl ricinoleate, dibutyl sebacate, and various trimellitic esters. Phthalic ester type plasticizers (DMP, DEP, DBP, DOP, DPP, and DEHP) are preferably used. In particular, DEP and DPP are preferred.

The additive amount of a plasticizer is preferably 0.1 to 25 percent by mass, more preferably 1 to 20 percent by mass, and much more preferably 3 to 15 percent by mass with respect to the mass of the cellulose acylate.

A deterioration inhibitor (e.g., an antioxidizing agent, peroxide decomposer, radical inhibitor, metal inactivating agent, oxygen scavenger, or amine) may be added to the polymer film. Deterioration inhibitors are described in JPA Nos. hei 3-199201, hei 5-1907073, hei 5-194789, hei 5-271471, and hei 6-107854. The additive amount of the deterioration inhibitor is preferably 0.01 to 1 percent by mass, and more preferably 0.01 to 0.2 percent by mass of the solution (dope) to be prepared. When the additive amount is less than 0.01 percent by mass, the effect of the deterioration inhibitor is substantially unrecognizable. When the additive amount is in the excess of 1 percent by mass, the deterioration inhibitor may bleed out on the surface of the film. Butylated hydroxytoluene (BHT) and tribenzylamine (TBA) are particularly preferable deterioration inhibitors.

The cellulose acylate film may be stretched. The draw ratio in stretching is preferably from 3 to 100% or so. The stretching may be carried out by using a tenter. When stretched, the film may have a desired retardation. The stretching direction of the film may be in the transverse direction or in the machine direction. For stretching in the transverse direction, a tenter may be used; and for stretching in the machine direction, rolls may be used. Regarding the stretching temperature and the preferred amount of the residual solvent in the film, for example, referred to are the techniques described in JPA Nos. S62-115035, H4-152125, H4-284211, and Hatsumei Kyokai's Disclosure Bulletin 2001-1745, p. 29.

In the invention, a film prepared by casting a cellulose dope onto a metal support, partly drying it, then peeling the solvent-containing web, stretching it with a tenter and drying and winding it, may be used as the film for the invention. The process of preparing the film includes at least two-stage stretching step of peeling and then continuously stretching the film with a tenter (line-stretching), or once winding the film and re-stretching it (off-line stretching). Preferably, a step of line-stretching in a draw ratio of from 10 to 40%, and a step of off-line stretching in a draw ratio of from 15 to 30% are combined. More preferably, 20 to 30% line-stretching is combined with 15 to 25% off-lien stretching. In off-line stretching, preferably, the film is pre-heated at a temperature higher than the stretching temperature, before it is stretched.

In case where the cellulose acylate film is made to function also as a transparent protective film for polarizing films in addition to the function thereof as the retardation film, the cellulose acylate film is preferably surface-treated for enhancing its adhesiveness to polarizing elements.

The surface treatment includes corona discharge treatment, glow discharge treatment, flame treatment, acid treatment, alkali treatment or UV irradiation treatment. Preferred is acid treatment or alkali treatment; and more preferred is alkali treatment.

In the invention, the thickness of the retardation films A and B is preferably from 30 to 100 μm each. When the thicknesses of the retardation films fall within the range, then it is favorable as satisfying both the requirement of film thickness reduction and the optical properties.

One preferred embodiment of the invention is such that, as so described in the above, Re of the retardation film A satisfies the above condition (III) and Rth thereof satisfies the above condition (VI) (or that is, both Re and Rth of the film A have regular wavelength dispersion characteristics), and Re of the retardation film B satisfies the above condition (IV) and Rth thereof satisfies the above condition (VII) (or that is, both Re and Rth of the film B have reversed wavelength dispersion characteristics).

The cellulose acylate film satisfying the conditions of (I) and (II) and having the regular wavelength dispersion characteristics of both of Re and Rth may be prepared by using the cellulose acylate composition containing at least one compound having an absorption peak at a wavelength falling within the range from 250 to 380 nm, preferably, such compound is selected from compounds represented by formula (I).

The cellulose acylate film satisfying the conditions of (I) and (II) and having the reversed wavelength dispersion characteristics of both of Re and Rth may be prepared by using the cellulose acylate composition containing not only the liquid crystal compound represented by formula (A) but also the liquid crystal compound represented by formula (a) as Re enhancer. The details of and preferable examples of the compounds represented by the formulae are described above.

[Polarizing Plate]

A polarizing plate fabricated by integrating a cellulose acylate film serving as the retardation film with a linear polarizing film (polarizing film) may be used in the liquid-crystal display device of the invention. The polarizing plate may be fabricated by laminating the retardation film and a linear polarizing film (this may be referred to simply as "polarizing film"). The cellulose acylate film for the retardation film may serve also as a protective film for the linear polarizing film.

The linear polarizing film is preferably a coated polarizing film typically by Optiva Inc., or a polarizing film comprising a binder, and iodine or a dichroic dye. Iodine and a dichroic die in the linear polarizing film express polarizability when aligned in binder. Iodine and the dichroic dye preferably align along the binder molecules, or the dichroic dye preferably aligns in one direction as self-textured like liquid crystal. Polarizing elements that are now commercially available are generally fabricated by dipping a stretched polymer in a solution of iodine or a dichroic dye in a dyeing bath, whereby iodine or the dichroic dye is infiltrated into the binder.

On the surface of the linear polarizing film opposite to the surface thereof to which a retardation film has been stuck, a polymer film is preferably disposed (in a configuration of retardation film/polarizing film/polymer film).

Preferably, the polymer film has, as provided thereon, an antireflection film having soiling resistance and scratch resistance on its outermost surface. The antireflection film may be any conventional known one.

EXAMPLES

The invention is described more concretely with reference to the following Examples, in which the material, the reagent and the substance used, their amount and ratio, and the details of the treatment may be suitably modified or changed not overstepping the spirit and the scope of the invention. Accordingly, the invention should not be limited to the Examples mentioned below.

[Production of Cellulose Acylate Film 101]

The ingredients shown below were mixed to prepare a cellulose acylate solution having a formulation shown below. The cellulose acylate solution was cast on a band, using a band casting device to form a web; and then the resulting web was separated from the band. After that, the web was stretched in the TD direction at a temperature of 140° C. in which the stretching ratio was 40%, and then dried to form a film. In this way, a cellulose acylate film having a thickness of 55 μm was produced. This was used as Cellulose acylate film 101.

| (Cellulose acylate solution) | |
|---|---|
| Cellulose acetate (the degree of substitution with acetyl: 2.80) | 100 parts by mass |

| (Cellulose acylate solution) | |
|---|---|
| Compound F-1 shown below | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

Compound F-1:

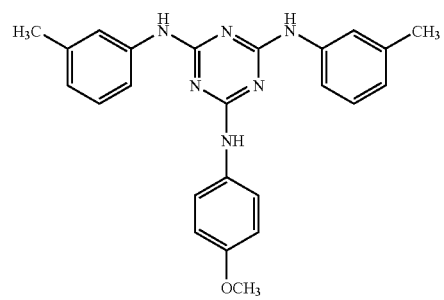

[Production of Cellulose Acylate Film 102]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 40%, and then dried to form a film. In this way, a cellulose acylate film having a thickness of 50 μm was produced. This was used as Cellulose acylate film 102.

| (Cellulose acylate solution) | |
|---|---|
| Cellulose acetate (the degree of substitution with acetyl: 2.80) | 100 parts by mass |
| Compound F-1 shown above | 2.5 parts by mass |
| Compound F-2 shown below | 2 parts by mass |
| Compound F-3 shown below | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

Compound F-2

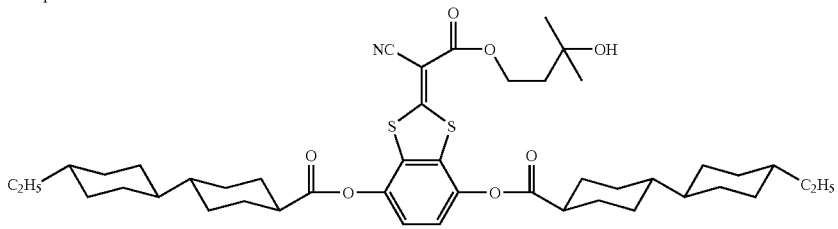

Compound F-3

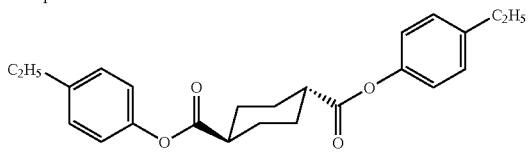

[Production of Cellulose Acylate Film 103]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 40%, and then dried to form a film. In this way, a cellulose acylate film having a thickness of 50 μm was produced. This was used as Cellulose acylate film 103.

| (Cellulose acylate solution) | |
| --- | --- |
| Cellulose acetate (the degree of substitution with acetyl: 2.80) | 100 parts by mass |
| Compound F-1 shown above | 2 parts by mass |
| Compound F-2 shown above | 2 parts by mass |
| Compound F-3 shown above | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

[Production of Cellulose Acylate Films 104 and 105]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 25%, and then dried to form a film. In this way, a cellulose acylate film having a thickness of 40 μm was produced. This was used as Cellulose acylate film 104.

| (Cellulose acylate solution) | |
| --- | --- |
| Cellulose acetate (the degree of substitution with acetyl: 1.54; the degree of substitution with propyonyl: 0.84) | 100 parts by mass |
| Additive K-1 shown below | 5 parts by mass |
| Additive K-2 shown below | 4 parts by mass |
| Methylene chloride | 416 parts by mass |
| Ethanol | 79 parts by mass |

K-1

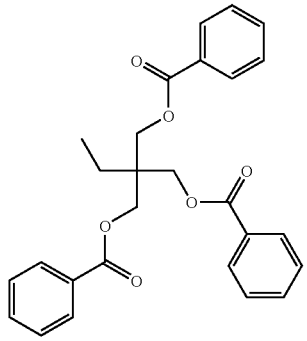

K-2

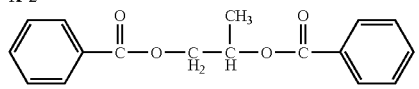

According to the similar method to the method for preparing Cellulose acylate film 104, a cellulose acylate film having a thickness of 52 μm was produced. This was used as Cellulose acylate film 105.

[Production of Norbornene Polymer Films 106 to 110]

A commercial norbornene polymer film "ZEONOR" (by Nippon Zeon) was stretched in the transverse direction by 32% with fixing it in the machine direction at 140° C., thereby producing a film 106. The thickness of the film was 70 μm.

A commercial norbornene polymer film "ZEONOR" (by Nippon Zeon) was stretched in the transverse direction by 35% with fixing it in the machine direction at 140° C., thereby producing a film 107. The thickness of the film was 65 μm.

A commercial norbornene polymer film "ZEONOR" (by Nippon Zeon) was stretched in the transverse direction by 30% with fixing it in the machine direction at 140° C., thereby producing a film 108. The thickness of the film was 70 μm.

A commercial norbornene polymer film "ZEONOR" (by Nippon Zeon) was stretched in the transverse direction by 40% with fixing it in the machine direction at 140° C., thereby producing a film 109. The thickness of the film was 65 μm.

A commercial norbornene polymer film "ZEONOR" (by Nippon Zeon) was stretched in the transverse direction by 40% with fixing it in the machine direction at 140° C., thereby producing a film 110. The thickness of the film was 75 μm.

[Production of Cellulose Acylate Film 111]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 35%, and then dried to form a film. In this way, a cellulose acylate film having a thickness of 50 μm was produced. This was used as Cellulose acylate film 111.

| (Cellulose acylate solution) | |
| --- | --- |
| Cellulose acetate (the degree of substitution with acetyl: 2.80) | 100 parts by mass |
| Compound F-1 shown above | 1.5 parts by mass |
| Compound F-2 shown above | 2 parts by mass |
| Compound F-3 shown above | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

[Preparation of Cellulose Acylate Film 112]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 40%, and then dried to form a film. In this way, a cellulose acylate film having a thickness of 50 μm was produced. This was used as Cellulose acylate film 112.

| (Cellulose acylate solution) | |
| --- | --- |
| Cellulose acetate (the degree of substitution with acetyl: 2.80) | 100 parts by mass |
| Compound F-1 shown above | 3 parts by mass |
| Compound F-2 shown above | 2 parts by mass |
| Compound F-3 shown above | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

[Production of Cellulose Acylate Film 113]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 20%, and then dried to form a film. In this way, a cellulose acylate film having a thickness of 55 μm was produced. This was used as Cellulose acylate film 113.

| (Cellulose acylate solution) | |
|---|---|
| Cellulose acetate (the degree of substitution with acetyl: 2.80) | 100 parts by mass |
| Compound F-1 shown above | 2 parts by mass |
| Triphenyl phosphate | 3 parts by mass |
| Diphenyl phosphate | 2 parts by mass |
| Methylene chloride | 418 parts by mass |
| Methanol | 62 parts by mass |

[Production of Cellulose Acylate Film 114]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction with the stretching ratio of 22%, and then dried to form a film. The obtained film was preheated at 200° C., subsequently heated at 175° C., stretched in the TD direction at a temperature of 175° C. in which the stretching ratio was 20%, and then dried to form a cellulose acylate film having a thickness of 45 μm. This was used as Cellulose acylate film 114.

| (Cellulose acylate solution) | |
|---|---|
| Cellulose acetate (the degree of substitution with acetyl: 2.81) | 100 parts by mass |
| Compound F-1 shown above | 6 parts by mass |
| Triphenyl phosphate | 3.5 parts by mass |
| Diphenyl phosphate | 2 parts by mass |
| Methylene chloride | 418 parts by mass |
| Methanol | 62 parts by mass |

[Production of Cellulose Acylate Film 115]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction with the stretching ratio of 25%, and then dried to form a film. The obtained film was preheated at 200° C., subsequently heated at 175° C., stretched in the TD direction at a temperature of 175° C. in which the stretching ratio was 25%, and then dried to form a cellulose acylate film having a thickness of 42 μm. This was used as Cellulose acylate film 115.

| (Cellulose acylate solution) | |
|---|---|
| Cellulose acetate (the degree of substitution with acetyl: 2.81) | 100 parts by mass |
| Compound F-1 shown above | 7 parts by mass |
| Triphenyl phosphate | 3.5 parts by mass |
| Diphenyl phosphate | 2 parts by mass |
| Methylene chloride | 418 parts by mass |
| Methanol | 62 parts by mass |

[Production of Cellulose Acylate Film 116]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 20%, and then dried to form a film. In this way, a cellulose acylate film having a thickness of 50 μm was produced. This was used as Cellulose acylate film 116.

| (Cellulose acylate solution) | |
|---|---|
| Cellulose acetate (the degree of substitution with acetyl: 2.81) | 100 parts by mass |
| Compound F-1 shown above | 0.5 parts by mass |
| Compound F-2 shown above | 2.5 parts by mass |
| Compound F-3 shown above | 3 parts by mass |
| Triphenyl phosphate | 3 parts by mass |
| Diphenyl phosphate | 2 parts by mass |
| Methylene chloride | 418 parts by mass |
| Methanol | 62 parts by mass |

[Production of Cellulose Acylate Film 117]

The ingredients shown below were mixed to prepare a cellulose acylate solution having a formulation shown below. The cellulose acylate solution was cast on a band using a band casting device to form a web; and then the web was separated from the band. After that, the web was stretched in the TD direction at a temperature of 140° C. in which the stretching ratio was 20%, and then dried to form a film. In this way, a cellulose acylate film having a thickness of 52 μm was produced. This was used as Cellulose acylate film 117.

| (Cellulose acylate solution) | |
|---|---|
| Cellulose acetate (the degree of substitution with acetyl: 2.81) | 100 parts by mass |
| Compound F-1 shown above | 0.5 parts by mass |
| Compound F-2 shown above | 3.5 parts by mass |
| Compound F-3 shown above | 3 parts by mass |
| Triphenyl phosphate | 3 parts by mass |
| Diphenyl phosphate | 2 parts by mass |
| Methylene chloride | 418 parts by mass |
| Methanol | 62 parts by mass |

The films 101 to 117 produced in the above were analyzed for their optical characteristics, and their data are shown in the following Table.

TABLE 1

| Film No. | Material | Re (nm) | Rth (nm) | Re(446)/Re(548) Re(628)/Re(548) | * | Rth(446)/Rth(548) Rth(628)/Rth(548) | ** |
|---|---|---|---|---|---|---|---|
| 101 | Cellulose acylate | 55 | 120 | 1.026 0.992 | (IV) | 1.008 0.998 | (VII) |
| 102 | Cellulose acylate | 55 | 120 | 0.961 1.011 | (III) | 0.961 1.014 | (VI) |
| 103 | Cellulose acylate | 60 | 110 | 0.961 1.011 | (III) | 0.961 1.014 | (VI) |
| 104 | Cellulose acylate | 55 | 120 | 0.965 1.011 | (III) | 0.965 1.008 | (VI) |
| 105 | Cellulose acylate | 45 | 125 | 0.965 1.011 | (III) | 0.965 1.008 | (VI) |
| 106 | Norborne base polymer | 55 | 120 | 1.000 1.000 | (V) | 1.000 1.000 | (VIII) |
| 107 | Norbornene polymer | 60 | 110 | 1.000 1.000 | (V) | 1.000 1.000 | (VIII) |
| 108 | Norbornene polymer | 53 | 120 | 1.000 1.000 | (V) | 1.000 1.000 | (VIII) |
| 109 | Norbornene polymer | 70 | 100 | 1.000 1.000 | (V) | 1.000 1.000 | (VIII) |
| 110 | Norbornene polymer | 70 | 125 | 1.000 1.000 | (V) | 1.000 1.000 | (VIII) |
| 111 | Cellulose acylate | 70 | 100 | 0.961 1.011 | (III) | 0.961 1.014 | (VI) |
| 112 | Cellulose acylate | 70 | 125 | 0.961 1.011 | (III) | 0.961 1.014 | (VI) |
| 113 | Cellulose acylate | 45 | 125 | 1.026 0.992 | (IV) | 1.008 0.998 | (VII) |
| 114 | Cellulose acylate | 50 | 115 | 1.016 0.993 | (IV) | 1.005 0.997 | (VII) |
| 115 | Cellulose acylate | 60 | 115 | 1.018 0.994 | (IV) | 1.010 0.996 | (VII) |
| 116 | Cellulose acylate | 50 | 115 | 0.85 1.04 | (IV) | 0.905 1.05 | (VII) |
| 117 | Cellulose acylate | 60 | 115 | 0.837 1.045 | (IV) | 0.891 1.05 | (VII) |

*: Any one of the conditions of (III) to (V) that Re of the film satisfies.
**: Any one of the conditions of (VI) to (VIII) that Rth of the film satisfies.

[Production of Polarizing Plate]

The surface of each of the films produced in the above was saponified with alkali. Concretely, the film was dipped in an aqueous 1.5 N sodium hydroxide solution at 55° C. for 2 minutes, then washed on a rinsing bath at room temperature, and neutralized with 0.1 N sulfuric acid at 30° C. Again, this was washed in a rinsing bath at room temperature and dried in hot air at 100° C. Next, a polyvinyl alcohol film roll having a thickness of 80 μm was unrolled and continuously stretched by 5 times in an aqueous iodine solution, then dried to give a polarizing film having a thickness of 20 μm. Using an aqueous 3% polyvinyl alcohol (Kuraray's PVA-117H) solution as an adhesive, the alkali-saponified films 101 to 113, and a film Fujitac TD80UL (by FUJIFILM) also saponified with alkali in the same manner were prepared, and the former were individually combined with the latter and stuck together via a polarizing film sandwiched therebetween in such a manner that the saponified surface of the two films could face the polarizing film, thereby fabricating polarizing plates in which the film and TD80UL could be the protective films for the polarizing film.

[Production of Liquid-Crystal Display Devices Nos. 1 to 12]

Using each of the polarizing plates fabricated in the above, liquid-crystal display devices Nos. 1 to 12 having the same constitution as in FIG. 1 were constructed. Concretely, a VA-mode liquid-crystal cell (Δnd=300 nm) was used as the liquid-crystal cell, and the polarizing plates were incorporated in the device in FIG. 1 on the panel side and on the backlight side thereof (P1 and P2 in FIG. 1), thereby constructing the liquid-crystal display device as in the following Table showing the combination of the retardation films in each device. In the device, the slow axes of the retardation films were kept perpendicular to each other, as in FIG. 1.

(Evaluation)

Transmittances in the Black and the White Sates:

The liquid-crystal display devices Nos. 1 to 12 constructed in the above were driven to measure the transmittances in the black and the white states, in the front direction (or in other words in the normal line direction relative to the displaying plane) and in an oblique direction (in the direction at a polar angle of 45 degrees and an azimuth angle of 60 degrees), thereby to determine the front contrast and the oblique contrast thereof. The results are shown in the following Table.

Color Shift in the Black State:

The liquid-crystal display devices Nos. 1 to 12 constructed in the above were driven to measure the color shift in the black state, $\Delta u'v'$ $(=\sqrt{q(u'max-u'min)^2+(v'max-v'min)^2})$. In this, u'max (v'max) means the largest u' (v') at an angle of from 0 to 360 degrees; and u'min (v'min) means the smallest u' (v') at an angle of from 0 to 360 degrees. The results are shown in the following Table.

TABLE 2

| LCD No. | Displaying-side Retardation Film | Backlight-side Retardation Film | CR in the oblique direction | Color shift in the black state (Δu'v') | Note |
|---|---|---|---|---|---|
| 1 | Film 101 Re: (IV), Rth: (VII) | Film102 Re: (III), Rth: (VI) | 62 | 0.04 | invention |
| 2 | Film101 Re: (IV), Rth: (VII) | Film104 Re: (III), Rth: (VI) | 60 | 0.05 | Invention |
| 3 | Film101 Re: (IV), Rth: (VII) | Film106 Re: (V), Rth: (VIII) | 58 | 0.06 | Invention |
| 4 | Film107 Re: (V), Rth: (VIII) | Film103 Re: (III), Rth: (VI) | 65 | 0.05 | Invention |
| 5 | Film106 Re: (V), Rth: (VIII) | Film104 Re: (III), Rth: (VI) | 60 | 0.06 | Invention |
| 6 | Film105 Re: (III), Rth: (VI) | Film105 Re: (III), Rth: (VI) | 52 | 0.06 | Comparative Example |
| 7 | Film108 Re: (V), Rth: (VIII) | Film108 Re: (V), Rth: (VIII) | 55 | 0.07 | Comparative Example |
| 8 | Film109 Re: (V), Rth: (VIII) | Film111 Re: (III), Rth: (VI) | 65 | 0.05 | Invention |
| 9 | Film110 Re: (V), Rth: (VIII) | Film112 Re: (III), Rth: (VI) | 62 | 0.06 | Invention |
| 10 | Film113 Re: (IV), Rth: (VII) | Film105 Re: (III), Rth: (VI) | 55 | 0.05 | Invention |
| 11 | Film114 Re: (IV), Rth: (VII) | Film116 Re: (III), Rth: (VI) | 60 | 0.04 | Invention |
| 12 | Film115 Re: (IV), Rth: (VII) | Film117 Re: (III), Rth: (VI) | 65 | 0.03 | Invention |

From the data in the above Table, it is known that the liquid-crystal display devices of the invention, comprising films having Re(548) and Rth(548) on the same level but having different wavelength dispersion characteristics of Re and Rth, as the displaying-side retardation film and the backlight-side retardation film, are all better than the comparative liquid-crystal display devices comprising the same film both as the displaying-side retardation film and the backlight-side retardation film, in that the oblique contrast of the former is higher than that of the latter and that the color shift of the former in oblique directions in the black state is smaller than that of the latter.

What is claimed is:

1. A liquid-crystal display device comprising:
a liquid-crystal cell comprising a liquid-crystal layer that aligns vertically to the substrate thereof in the black state,
first and second polarizing elements that are disposed to sandwich the liquid-crystal cell therebetween so that their absorption axes are orthogonal to each other,
a retardation film A disposed between the first polarizing element and the liquid-crystal cell and satisfying the following conditions (I) and (II), and
a retardation film B disposed between the second polarizing element and the liquid-crystal cell and satisfying the following conditions (I) and (II),
wherein the retardation films A and B are equivalent to each other in terms of retardation in plane at a wavelength of 548 nm, Re(548), and retardation along thickness direction at a wavelength of 548 nm, Rth(548) thereof, but differ from each other in terms of the wavelength dispersion characteristics of retardation in plane Re and/or retardation along thickness direction Rth thereof in a visible light region:

$$30 \text{ nm} \leq Re(548) \leq 80 \text{ nm}, \quad (I)$$

$$70 \text{ nm} \leq Rth(548) \leq 140 \text{ nm}, \quad (II)$$

where $Re(\lambda)$ [nm] means retardation in plane of the film measured at a wavelength $\lambda$ [nm]; and $Rth(\lambda)$ [nm] means retardation along thickness direction of the film measured at a wavelength $\lambda$ [nm]; and wherein retardation in plane Re of the retardation film A satisfies any of the following conditions (III) to (V), and retardation in plane Re of the retardation film B satisfies any of the following conditions (III) to (V) other than that which Re of the retardation film A satisfies:

$$Re(446)/Re(548)<1 \text{ and } Re(628)/Re(548)>1, \quad (III)$$

$$Re(446)/Re(548)>1 \text{ and } Re(628)/Re(548)<1, \quad (IV)$$

$$|Re(446)-Re(628)|/Re(548)<0.03. \quad (V)$$

2. The liquid-crystal display device of claim 1, wherein retardation along thickness direction Rth of the retardation film A satisfies any of the following conditions (VI) to (VIII), and retardation along thickness direction Rth of the retardation film B satisfies any of the following conditions (VI) to (VIII) other than that which Rth of the retardation film A satisfies:

$$Rth(446)/Rth(548)<1 \text{ and } Rth(628)/Rth(548)>1, \quad (VI)$$

$$Rth(446)/Rth(548)>1 \text{ and } Rth(628)/Rth(548)<1, \quad (VII)$$

$$|Rth(446)-Rth(628)|/Rth(548)<0.0125. \quad (VIII)$$

3. The liquid-crystal display device of claim 1, wherein at least one of the retardation films A and B is a norbornene-based polymer film.

4. The liquid-crystal display device of claim 1, wherein at least one of the retardation films A and B is a cellulose acylate film.

5. The liquid-crystal display device of claim 4, wherein the cellulose acylate film comprises a cellulose acylate having at least one acyl group selected from an acetyl group, a propionyl group and a butyryl group.

6. The liquid-crystal display device of claim 4, wherein the cellulose acylate film comprises a cellulose acylate having at least two acyl groups selected from an acetyl group, a propionyl group and a butyryl group.

7. The liquid-crystal display device of claim 4, wherein the cellulose acylate film comprises at least one discotic compound having an absorption peak at a wavelength falling within the range from 250 nm to 380 nm.

8. The liquid-crystal display device of claim 4, wherein the cellulose acylate film comprises at least one liquid crystal compound.

9. The liquid-crystal display device of claim 8, wherein said at least one liquid crystal compound is a compound represented by formula (A):

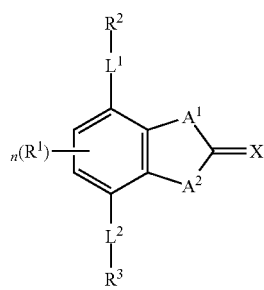

Formula (A)

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

10. The liquid-crystal display device of claim 8, wherein said at least one liquid crystal compound is a compound represented by formula (a):

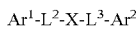

$Ar^1\text{-}L^2\text{-}X\text{-}L^3\text{-}Ar^2$    Formula (a):

where $Ar^1$ and $Ar^2$ independently represent an aromatic group; $L^2$ and $L^3$ independently represent —O—CO— or —CO—O—; and X represents 1,4-cyclohexylen, vinylene or ethynylene.

11. The liquid-crystal display device of claim 8, wherein said at least one liquid crystal compound is a compound represented by formula (I):

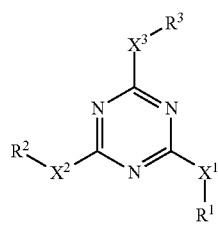

Formula (I)

where $X^1$ represents a single bond, —$NR^4$—, —O— or —S—; $X^2$ represents a single bond, —$NR^5$—, —O— or —S—; $X^3$ represents a single bond, —$NR^6$—, —O— or —S—; $R^1$, $R^2$, and $R^3$ independently represent an alkyl group, an alkenyl group, an aromatic ring group or a hetero-ring group; and $R^4$, $R^5$ and $R^6$ independently represent a hydrogen atom, an alkyl group, an alkenyl group, an aryl group or a hetero-ring group.

12. The liquid-crystal display device of claim 1, wherein the thickness of the retardation films A and B is from 30 to 100 μm each.

13. The liquid-crystal display device of claim 1, wherein at least one of the retardation films A and B is a stretched film.

14. A liquid-crystal display device comprising:
a liquid-crystal cell comprising a liquid-crystal layer that aligns vertically to the substrate thereof in the black state,
first and second polarizing elements that are disposed to sandwich the liquid-crystal cell therebetween so that their absorption axes are orthogonal to each other,
a retardation film A disposed between the first polarizing element and the liquid-crystal cell and satisfying the following conditions (I) and (II), and
a retardation film B disposed between the second polarizing element and the liquid-crystal cell and satisfying the following conditions (I) and (II),
wherein the retardation films A and B are equivalent to each other in terms of retardation in plane at a wavelength of 548 nm, Re(548), and retardation along thickness direction at a wavelength of 548 nm, Rth(548) thereof, but differ from each other in terms of the wavelength dispersion characteristics of retardation in plane Re and/or retardation along thickness direction Rth thereof in a visible light region:

$30\ nm \leq Re(548) \leq 80\ nm$,    (I)

$70\ nm \leq Rth(548) \leq 140\ nm$,    (II)

where Re(λ) [nm] means retardation in plane of the film measured at a wavelength λ [nm]; and Rth(λ) [nm] means retardation along thickness direction of the film measured at a wavelength λ [nm]; and
wherein retardation along thickness direction Rth of the retardation film A satisfies any of the following conditions (VI) to (VIII), and retardation along thickness direction Rth of the retardation film B satisfies any of the following conditions (VI) to (VIII) other than that which Rth of the retardation film A satisfies:

$Rth(446)/Rth(548)<1$ and $Rth(628)/Rth(548)>1$,    (VI)

$Rth(446)/Rth(548)>1$ and $Rth(628)/Rth(548)<1$,    (VII)

$|Rth(446)-Rth(628)|/Rth(548)<0.0125$    (VIII).

15. The liquid-crystal display device of claim 14, wherein at least one of the retardation films A and B is a norbornene-based polymer film.

16. The liquid-crystal display device of claim 14, wherein at least one of the retardation films A and B is a cellulose acylate film.

17. The liquid-crystal display device of claim 16, wherein the cellulose acylate film comprises a cellulose acylate having at least one acyl group selected from an acetyl group, a propionyl group and a butyryl group.

18. The liquid-crystal display device of claim 16, wherein the cellulose acylate film comprises a cellulose acylate having at least two acyl groups selected from an acetyl group, a propionyl group and a butyryl group.

19. The liquid-crystal display device of claim 16, wherein the cellulose acylate film comprises at least one discotic compound having an absorption peak at a wavelength falling within the range from 250 nm to 380 nm.

20. The liquid-crystal display device of claim 16, wherein the cellulose acylate film comprises at least one liquid crystal compound.

21. The liquid-crystal display device of claim 20, wherein said at least one liquid crystal compound is a compound represented by formula (A):

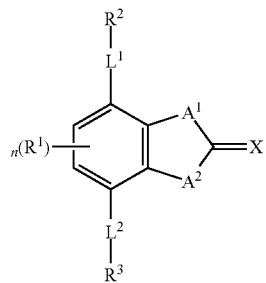

Formula (A)

where $L^1$ and $L^2$ independently represent a single bond or a divalent linking group; $A^1$ and $A^2$ independently represent a group selected from the group consisting of —O—, —NR— where R represents a hydrogen atom or a substituent, —S— and —CO—; $R^1$, $R^2$ and $R^3$ independently represent a substituent; X represents a nonmetal atom selected from the groups 14-16 atoms, provided that X may bind with at least one hydrogen atom or substituent; and n is an integer from 0 to 2.

22. The liquid-crystal display device of claim 20, wherein said at least one liquid crystal compound is a compound represented by formula (a):

$Ar^1$-$L^2$-X-$L^3$-$Ar^2$   Formula (a):

where $Ar^1$ and $Ar^2$ independently represent an aromatic group; $L^2$ and $L^3$ independently represent —O—CO— or —CO—O—; and X represents 1,4-cyclohexylen, vinylene or ethynylene.

23. The liquid-crystal display device of claim 20, wherein said at least one liquid crystal compound is a compound represented by formula (I):

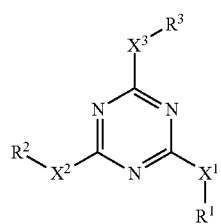

Formula (I)

where $X^1$ represents a single bond, —$NR^4$—, —O— or —S—; $X^2$ represents a single bond, —$NR^5$—, —O— or —S—; $X^3$ represents a single bond, —$NR^6$—, —O— or —S—; $R^1$, $R^2$, and $R^3$ independently represent an alkyl group, an alkenyl group, an aromatic ring group or a hetero-ring group; and $R^4$, $R^5$ and $R^6$ independently represent a hydrogen atom, an alkyl group, an alkenyl group, an aryl group or a hetero-ring group.

24. The liquid-crystal display device of claim 14, wherein the thickness of the retardation films A and B is from 30 to 100 μm each.

25. The liquid-crystal display device of claim 14, wherein at least one of the retardation films A and B is a stretched film.

* * * * *